United States Patent
Kosaka et al.

(10) Patent No.: US 8,614,838 B2
(45) Date of Patent: Dec. 24, 2013

(54) IMAGE PROCESSING APPARATUS AND IMAGE PROCESSING METHOD

(75) Inventors: Ryo Kosaka, Toyko (JP); Reiji Misawa, Tokyo (JP); Tomotoshi Kanatsu, Tokyo (JP); Hidetomo Sohma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 24 days.

(21) Appl. No.: 12/973,118

(22) Filed: Dec. 20, 2010

(65) Prior Publication Data

US 2011/0167081 A1 Jul. 7, 2011

(30) Foreign Application Priority Data

Jan. 5, 2010 (JP) .................................. 2010-000489

(51) Int. Cl.
- *H04N 1/40* (2006.01)
- *H04N 1/387* (2006.01)
- *G09G 5/00* (2006.01)
- *G06F 17/00* (2006.01)
- *G06F 17/30* (2006.01)

(52) U.S. Cl.
CPC ................. *H04N 1/40* (2013.01); *H04N 1/387* (2013.01); *G09G 5/00* (2013.01); *G06F 17/00* (2013.01); *G06F 17/30* (2013.01)
USPC ........... 358/448; 358/453; 358/461; 345/634; 345/636; 707/609; 707/756; 707/796

(58) Field of Classification Search
USPC ......... 707/705–712, 727–737, 802–804, 609, 707/756, 796; 382/164, 209, 218–219; 345/597, 625, 634, 636; 715/233, 243, 715/240, 273, 275; 358/1.9, 448, 461, 358/451–453
See application file for complete search history.

(56) References Cited

U.S. PATENT DOCUMENTS

| 5,669,005 A | * | 9/1997 | Curbow et al. ............... 715/234 |
| 6,178,434 B1 | | 1/2001 | Saitoh |

(Continued)

FOREIGN PATENT DOCUMENTS

| CN | 1702682 A | 11/2005 |
| CN | 101377787 A | 3/2009 |

(Continued)

OTHER PUBLICATIONS

Awais Adnan et al. "Content Based image Retrieval Using Geometrical-Shape of Objects in Image",2007 IEEE, 4 pages.*

(Continued)

*Primary Examiner* — Srirama Channavajjala
(74) *Attorney, Agent, or Firm* — Fitzpatrick, Cella, Harper & Scinto

(57) ABSTRACT

According to the present invention, it is possible to create electronic document data capable of highlighting an object detected through a search so that a user can easily recognize it. An image processing apparatus extracts an object from an input image and extracts metadata related to the object. The image processing apparatus, when determines to describe with a shape in accordance with the shape of the object, creates a vector path description of frame described with a shape in accordance with the shape of the object. Then, the image processing apparatus creates an electronic document including data of the input image and the vector path description of frame with which the metadata is associated. When a keyword search is performed on the created electronic document, highlight display is performed in accordance with the vector path description of frame with which metadata that matches the keyword is associated.

12 Claims, 28 Drawing Sheets

(56) References Cited

U.S. PATENT DOCUMENTS

| | | |
|---|---|---|
| 6,510,243 B1 | 1/2003 | Ikeda |
| 6,519,360 B1* | 2/2003 | Tanaka .......................... 382/162 |
| 6,807,303 B1* | 10/2004 | Kim et al. ..................... 382/203 |
| 7,047,238 B2* | 5/2006 | Tada et al. ............................. 1/1 |
| 7,051,048 B2 | 5/2006 | Sohma et al. |
| 7,349,577 B2 | 3/2008 | Kaneda et al. |
| 7,391,917 B2 | 6/2008 | Ohta et al. |
| 7,664,321 B2 | 2/2010 | Fukuoka et al. |
| 7,664,738 B2 | 2/2010 | Sohma |
| 7,680,331 B2 | 3/2010 | Tashiro et al. |
| 8,135,240 B2 | 3/2012 | Satoh |
| 8,213,690 B2* | 7/2012 | Okada et al. .................. 382/118 |
| 2001/0003182 A1* | 6/2001 | Labelle .............................. 707/3 |
| 2002/0136458 A1* | 9/2002 | Nagasaka et al. ............. 382/209 |
| 2003/0098862 A1* | 5/2003 | Hunt et al. ..................... 345/418 |
| 2003/0215144 A1* | 11/2003 | Kito et al. ..................... 382/190 |
| 2004/0100656 A1* | 5/2004 | Kuroki ......................... 358/1.16 |
| 2004/0220898 A1* | 11/2004 | Eguchi et al. ..................... 707/1 |
| 2005/0251748 A1* | 11/2005 | Gusmorino et al. ........... 715/713 |
| 2005/0265602 A1* | 12/2005 | Tashiro et al. ................ 382/185 |
| 2006/0007481 A1* | 1/2006 | Kato et al. .................... 358/1.15 |
| 2006/0062453 A1* | 3/2006 | Schacht ........................ 382/164 |
| 2006/0114484 A1* | 6/2006 | Kitora ......................... 358/1.13 |
| 2007/0146389 A1* | 6/2007 | Distler .......................... 345/629 |
| 2008/0180707 A1* | 7/2008 | Kanematsu .................... 358/1.9 |
| 2008/0212899 A1* | 9/2008 | Gokturk et al. ............... 382/305 |
| 2008/0222095 A1* | 9/2008 | Ii ...................................... 707/3 |
| 2008/0247675 A1 | 10/2008 | Magai et al. |
| 2008/0285855 A1 | 11/2008 | Shiiyama et al. |
| 2008/0304753 A1 | 12/2008 | Sohma et al. |
| 2009/0284787 A1* | 11/2009 | Imai ............................. 358/1.15 |
| 2010/0104266 A1 | 4/2010 | Yashiro et al. |
| 2010/0202015 A1 | 8/2010 | Misawa |
| 2010/0239160 A1 | 9/2010 | Enomoto et al. |

FOREIGN PATENT DOCUMENTS

| | | | |
|---|---|---|---|
| GB | 2444535 | * | 6/2008 |
| JP | 10-91766 | | 4/1998 |
| JP | 10228473 A | | 8/1998 |
| JP | 11306197 A | | 11/1999 |
| JP | 2001-103469 | | 4/2001 |
| WO | WO 2006/127480 | * | 11/2006 |

OTHER PUBLICATIONS

Chinese Office Action dated May 21, 2013, in counterpart Chinese Application No. 201010624599.8 (with whole English translation).
Japanese Office Action dated Oct. 1, 2013, issued during prosecution of related Japanese application No. 2010-000489.

* cited by examiner

| | ATTRIBUTE | AREA ACCOMPANIED BY CAPTION | COORDINATE X | COORDINATE Y | WIDTH W | HEIGHT H | PAGE | CHARACTER INFORMATION |
|---|---|---|---|---|---|---|---|---|
| 501 | HEADING | — | X1 | Y1 | W1 | H1 | 1 | SAMPLE |
| 502 | TABLE | — | X2 | Y2 | W2 | H2 | 1 | — |
| 503 | PHOTOGRAPH | — | X3 | Y3 | W3 | H3 | 1 | — |
| 504 | CAPTION | 503 | X4 | Y4 | W4 | H4 | 1 | FIG.1 |
| 505 | BODY TEXT | — | X5 | Y5 | W5 | H5 | 1 | ··FIG.1 IS AAA·· |

```
<?xml version="1.0" ?>
<svg xmlns="http://www.w3.org/2000/svg" width="2480" height="3520" xmns:x="http://@@@.jp">       600

601 {    <text x="X1" y="Y1" color="#000000"> HEADING </text>

602 {    <g><path stroke="#000000" d="M X2,Y2 L···" /></g>

603 {    <image x="X3" y="Y3" width="W3" height="H3"
              xlink :href="data:image/png;base64,Dez3632fsod6Xhd0dsc4d ......." />

604 {    <text x="X4" y="Y4" color="#000000">FIG.1</text>

605 {    <text x="X5" y="Y5" color="#000000">··· FIG.1 IS AAA ···</text>

<g x:caption_id = "1" >   608
606 {      <rect stroke="transparent" width="W3+2w" height="H3+2h", x="X3-w" y="Y3-h"/>
         </g>
                     609      610
         <desc>
           <metadata>
607 {        < x:meta id="1" str="AAA"/>
           </metadata>
         </desc>
         </svg>
```

FIG.6

| ATTRIBUTE | CHARACTER | PHOTOGRAPH | LINE DRAWING | TABLE |
|---|---|---|---|---|
| CONVERSION PROCESS | VECTOR CONVERSION | IMAGE CUTOUT | VECTOR CONVERSION | VECTOR CONVERSION (TABLE FRAME PORTION) |
| DELETION PROCESS | PRESENT | PRESENT | PRESENT | PRESENT |

FIG.7A

| ATTRIBUTE | CHARACTER | PHOTOGRAPH | LINE DRAWING | TABLE |
|---|---|---|---|---|
| CONVERSION PROCESS | IMAGE CUTOUT (BINARY) | ABSENT | | |
| DELETION PROCESS | PRESENT | ABSENT | | |

FIG.7B

| ATTRIBUTE | CHARACTER | PHOTOGRAPH | LINE DRAWING | TABLE |
|---|---|---|---|---|
| CONVERSION PROCESS | IMAGE CUTOUT (BINARY) | IF CAPTION IDENTIFIER IS ATTACHED IMAGE CUTOUT | VECTOR CONVERSION | |
| DELETION PROCESS | PRESENT | DELETION PROCESS IS PRESENT IN AREAS WHERE CAPTION IDENTIFIER IS ATTACHED, ABSENT IN OTHER AREAS | | |

FIG.7C

| ATTRIBUTE | CHARACTER | PHOTOGRAPH | LINE DRAWING | TABLE |
|---|---|---|---|---|
| CONVERSION PROCESS | IMAGE CUTOUT (BINARY) | ABSENT | IF CAPTION IDENTIFIER IS ATTACHED, PERFORM VECTOR CONVERSION TO CREATE | |
| DELETION PROCESS | PRESENT | ABSENT | | |

FIG.7D

| | ATTRIBUTE | AREA ACCOMPANIED BY CAPTION | COORDINATE X | COORDINATE Y | WIDTH W | HEIGHT H | PAGE | CHARACTER INFORMATION |
|---|---|---|---|---|---|---|---|---|
| 905 | PHOTOGRAPH | – | X1 | Y1 | W1 | H1 | 1 | – |
| 906 | CAPTION | 905 | X2 | Y2 | W2 | H2 | 1 | FIG.1 |
| 907 | LINE DRAWING | – | X3 | Y3 | W3 | H3 | 2 | – |
| 908 | LINE DRAWING | – | X4 | Y4 | W4 | H4 | 2 | – |
| 909 | CAPTION | 907 | X5 | Y5 | W5 | H5 | 2 | A STAR |
| 910 | CAPTION | 908 | X6 | Y6 | W6 | H6 | 2 | MOON |
| 911 | LINE DRAWING | – | X7 | Y7 | W7 | H7 | 2 | – |
| 912 | CAPTION | 911 | X8 | Y8 | W8 | H8 | 2 | B STAR |
| 913 | BODY TEXT | – | X9 | Y9 | W9 | H9 | 2 | ...... |
| 914 | BODY TEXT | – | X10 | Y10 | W10 | H10 | 3 | ...... |
| 915 | BODY TEXT | – | X11 | Y11 | W11 | H11 | 4 | ··CAPTURED BY THE CAMERA OF FIG.1·· |

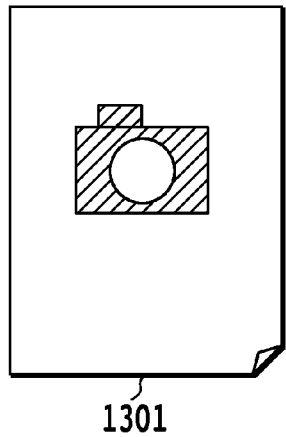 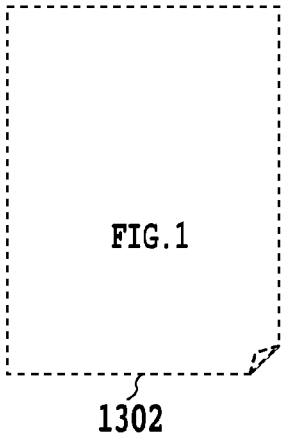 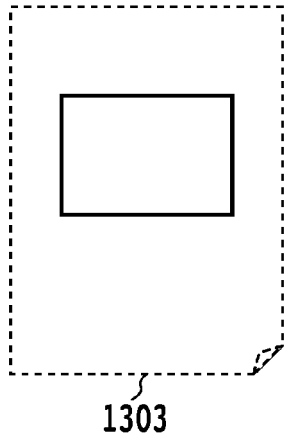
1301　　　　　　1302　　　　　　1303
FIG.13A
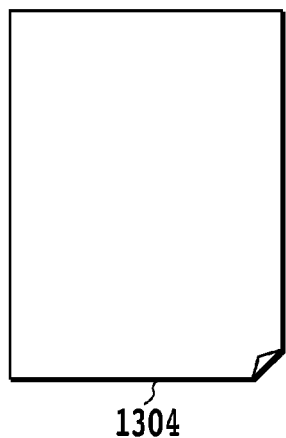 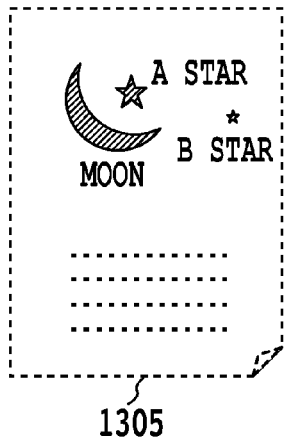 
1304　　　　　　1305　　　　　　1306
FIG.13B

```
<?xml version="1.0" ?>
<svg xmlns="http://www.w3.org/2000/svg" width="2480" height="3520"
     xmns:x="http://@@@.jp">

<image x="0" y="0" width="2480" height="3520"
        xlink:href="data:image/jpeg;base64,/9j/2wceAB8Vxsace93hd ........" />

<image x="780" y="608" width="694" height="208"
        xlink:href="data:image/png;base64,Dez3632fsod6Xhd0dsc4d ........" />

<g x:caption_id = "1">
   <use xlink:href="frame_square" transform="translate(100,100) scale(2)">
 </g>

<g id = "frame_square"
        fill ="none" stroke="transparent" stroke-width="5">
   <path d="M440,608 L2040,608 L2040,1880 L440,1880 L440,608 s"/>
 </g>

</svg>
```

| FIG.15A |
|---|
| FIG.15B |

FIG.15A

```
<?xml version="1.0" ?>
<svg xmlns="http://www.w3.org/2000/svg" width="2480" height="3520" xmlns:x="http://@@@.jp">

<pageSet>

<image x="0" y="0" width="2480" height="3520" xlink:href="data:image/jpeg;base64,/9j/2wceAB8Vxsace93hd ......." />
      <image x="790" y="808" width="894" height="208" xlink:href="data:image/png;base64,Dcz3632feed8Xhd0dae4d ......." />
      <g x:caption_id = "1"> <use xlink:href="frame_square" x="200" y="450" scale(1.5, 2.1)"> </g>

```

1510    1511    1501

```

<image x="0" y="0" width="2480" height="3520" xlink:href="data:image/jpeg;base64,/9j/2wceAB8Vxsace93hd ......." />
      <image x="160" y="380" width="2230" height="2580" xlink:href="data:image/png;base64,;5ponsfdfGJHGREZZC ......." />
      <g id="vec_img1">
        <path d = "M100.000  0.000   L 78.451  70.902    5.106  70.902   64.327 111.803   42.779 180.902
                   100.000 138.197  158.779 180.902  136.327 111.803  195.106  70.902  122.451  70.902   z"/>
      </g>
      <g id="vec_img2">
        <path d="M 30,40 Q 40,180 170,100"/>
        <path d="M 30,40 Q 80,130 170,100"/>
      </g>
      <g id="vec_img3">
        <path d = "M100.000 -100.000   L  56.902  41.804  -89.788  41.804   28.654 123.606  -14.442 261.804
                   100.000 176.394  217.558 261.804  172.654 123.606  290.212  41.804  144.902  41.804   z"/>
      </g>
      <g x:caption_id = "2"> <use xlink:href="vec_img1" transform="translate(-30,-30) scale(1.5)"> </g>
      <g x:caption_id = "3"> <use xlink:href="vec_img2" transform="translate(-20,-20) scale(1.3)"> </g>
      <g x:caption_id = "4">
        <use xlink:href="vec_img3" transform="translate(-50,-50) scale(2)">
        <use xlink:href="frame_arrow" x="300" y="240" scale(1.2)">
      </g>

```

1512, 1513, 1514, 1515, 1516, 1517, 1502

IMAGE PROCESSING APPARATUS AND IMAGE PROCESSING METHOD

BACKGROUND OF THE INVENTION

1. Field of the Invention

The present invention relates to an image processing apparatus and an image processing method for creating electronic document data whose objects can be searched from a document image.

2. Description of the Related Art

Conventionally, to easily use objects other than characters (for example, photograph, drawing, line drawing, table, and the like) in a document image, a technique for enabling the object to be searched is known. In the description below, the "object" indicates objects other than characters unless otherwise stated.

In Japanese Patent Laid-Open No. H11-306197 (1999), an object such as a drawing, a graph, or the like is extracted from a document image, and it is determined whether or not there is a caption character string (a character string explaining the object) near the object. When there is a caption character string, the caption character string is associated with the object, so that the object can be searched.

When the caption adjacent to the object is a figure number (for example, "FIG. 1", "FIG. 1", and the like), in a general document image, a character string of the same figure number is written also in a body text to explain the object. In other words, the same expression as the figure number written in the caption is also written in the body text. Japanese Patent Laid-Open No. H10-228973 (1998) discloses a technique for automatically creating a link between a figure number in a caption and a figure number in the body text to form a hypertext. In this technique, for example, when a figure number "FIG. 1" is included in a caption adjacent to an object and a sentence "FIG. 1 is AAA" is present in the body text, a hyperlink is created between the caption "FIG. 1" and the "FIG. 1" in the body text. Japanese Patent Laid-Open No. H10-228473 (1998) also describes that a link is automatically created between an object and a body text related to the object, and a hypertext document is created.

When objects with which metadata is associated are JPEG-compressed or the like and stored in one electronic document, the objects are created as one electronic document with a small amount of data. When such an electronic document is used by an application, it is possible to search for an object from the metadata using a caption character string as a search keyword.

On the other hand, in an electronic document in which caption character strings are given to objects respectively as metadata and objects other than characters can be searched for, when a keyword search is performed, it is desired that an object as a result of the search is highlighted.

However, the objects to be searched are photographs, drawings, tables, and the like which have various colors and shapes. Therefore, because highlighting of the object is inconspicuous due to the original color and shape of the object, it may be difficult for a user to identify an object hit in the search. For example, when a highlighting method by which a contour of a searched object is colored with a red circumscribed rectangle is used, if a rectangle photograph object including much red is hit in the search, highlighting of search result is in contact with the photograph area in the same color as that of the photograph, so that the highlighting is inconspicuous. Therefore, it is very difficult for the user to identify the object hit in the search. In addition, when the size of the object is small, or there is a plurality of objects adjacent to each other, it is impossible to intuitively identify the object hit in the search, and hence there is a problem that an improvement of search efficiency cannot be expected (refer to FIGS. 17A and 17C).

Therefore, in a process of creating electronic document data in which objects other than characters can be searched with a keyword, an electronic document data creation method is required which, in searching, performs highlighting of the object so that a user can easily recognize it while maintaining the shape and data state of the object to be searched.

SUMMARY OF THE INVENTION

An image processing apparatus according to the present invention comprises: an object extraction unit configured to extract an object from an input image; a metadata extraction unit configured to extract metadata related to the object; a determination unit configured to determine whether to describe a vector path description of frame with a shape in accordance with a shape of the object or to describe a vector path description of frame with a shape in accordance with a predetermined shape; a frame creation unit configured to create a vector path description of frame described with a shape in accordance with the shape of the object when the determination unit determines to describe with a shape in accordance with the shape of the object, and create a vector path description of frame described with a shape in accordance with the predetermined shape when the determination unit determines to describe with a shape in accordance with the predetermined shape; and a document creation unit configured to create an electronic document including data of the input image and the vector path description of frame with which the metadata is associated, wherein when a keyword search is performed on the electronic document, highlight display is performed in accordance with the vector path description of frame with which metadata that matches the keyword is associated.

An image processing apparatus according to the present invention comprises: an object extraction unit configured to extract an object from an input image; a metadata extraction unit configured to extract metadata related to the object; a frame creation unit configured to create a vector path description of frame described with a shape similar to an outer contour of the shape of the object; and a document creation unit configured to create an electronic document including data of the input image and the vector path description of frame with which the metadata is associated, wherein when a keyword search is performed on the electronic document, highlight display is performed in accordance with the vector path description of frame with which metadata that matches the keyword is associated.

An image processing apparatus according to the present invention comprises: a unit configured to extract an object from an input image and obtain area information which is information on the object; a unit configured to create a vector path description of a transparent frame which circumscribes the extracted object with a shape in accordance with the obtained area information; and a unit configured to create an electronic document including the created vector path description of the transparent frame, from the input image, wherein the created vector path description of the transparent frame includes a parameter description of a highlighting color for highlighting the frame when an object is searched for and detected as a search result from the created electronic document.

According to the present invention, it is possible to provide an image processing apparatus and an image processing method for creating electronic document data in which an object hit in a search can be highlighted so that a user can easily recognize the object.

Further features of the present invention will become apparent from the following description of exemplary embodiments (with reference to the attached drawings).

BRIEF DESCRIPTION OF THE DRAWINGS

FIG. 6 is a drawing showing an example of electronic document data output to the input image data;

FIGS. 7A to 7D are drawings showing an example of correspondence tables which are control information of the format conversion unit;

FIGS. 13A and 13B are drawings showing an example of graphics data;

FIG. 14 is an illustration showing an example of electronic document data output to the input image data;

FIG. 15 is a diagram showing the relationship of FIGS. 15A and 15B;

FIGS. 15A and 15B are illustrations showing an example of electronic document data output to the input image data;

DESCRIPTION OF THE EMBODIMENTS

Hereinafter, preferred embodiments of the present invention will be described in detail with reference to the drawings. However, the constituent elements described in the embodiments are only examples, and do not limit the scope of the present invention.

(First Embodiment)

First, a first embodiment for implementing the present invention will be described.

[Configuration of Image Processing System]

Figure 1:
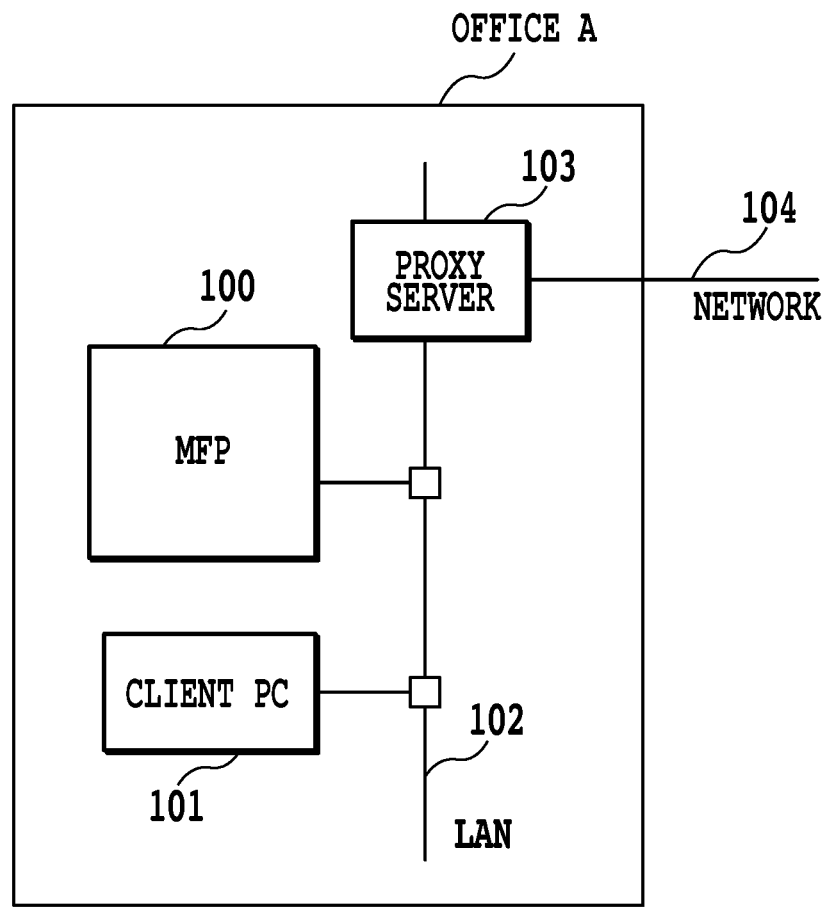
FIG. 1 is a block diagram showing a configuration example of an image processing system.

FIG. 1 is a block diagram showing a configuration of an image processing system according to this embodiment.

In FIG. 1, an MFP (Multi Function Peripheral) 100, which is a multi function device for realizing a plurality of functions (copy function, print function, transmitting function, and the like), is connected to a LAN 102 constructed in an office A. The LAN 102 is also connected to an external network 104 via a proxy server 103. A client PC 101 receives data transmitted from the MFP 100, uses functions of the MFP 100, and so forth via the LAN 102. For example, the client PC 101 can transmit print data to the MFP 100 and print a print material based on the print data by the MFP 100. The configuration in FIG. 1 is an example, and a plurality of offices having the same constituent elements as those in the office A may be connected to the network 104. The network 104 is a communication network realized typically by the Internet, a LAN, a WAN, a telephone line, a dedicated digital line, an ATM, a frame relay line, a communication-satellite channel, a cable TV line, a wireless circuit for data broadcasting, and so on. In other words, the network 104 may be anything that can transmit and receive data. Various terminals of the client PC 101 and the proxy server 103 include typical constituent elements mounted in a general purpose computer. For example, the constituent elements are a CPU, a RAM, a ROM, a hard disk, an external storage device, a network interface, a display, a keyboard, a mouse, and the like.

Figure 2:
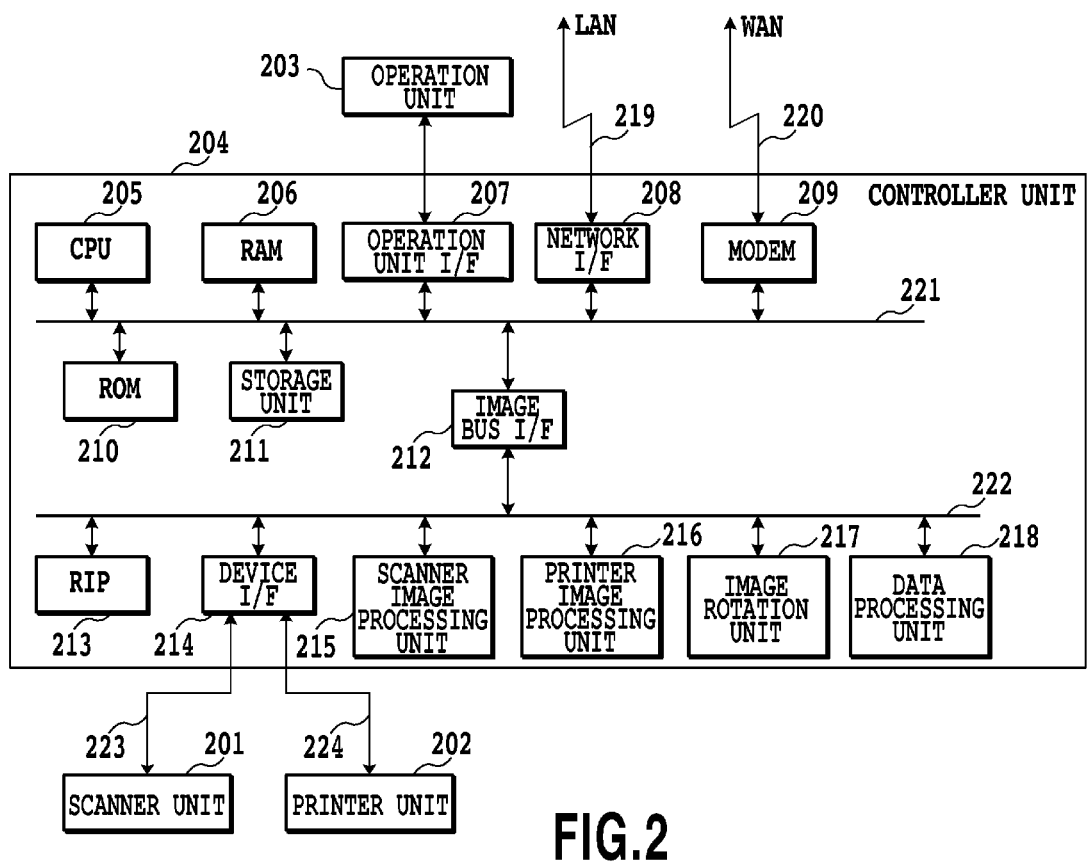
FIG. 2 is a block diagram showing a configuration example of MEP.

FIG. 2 is a diagram showing a detailed configuration of the MFP 100 which is an image processing apparatus according to this embodiment.

The MFP 100 includes a scanner unit 201 which is an image input device, a printer unit 202 which is an image output device, a controller unit 204 including a CPU 205 and the like, an operation unit 203 which is a user interface, and so forth. The controller unit 204 is a controller for performing input/output of image information and device information by connecting to the scanner unit 201, the printer unit 202, and the operation unit 203, and on the other hand, connecting to a LAN 219 and a public line (WAN) 220 which is a general telephone network. The CPU 205 controls each unit included in the controller unit 204. A RAM 206 is a system work memory for the CPU 205 to operate, and also an image memory for temporarily storing image data. A ROM 210 is a boot ROM which stores programs such as a boot program of the system. A storage unit 211 is a hard disk drive which stores system control software and image data. An operation unit I/F 207 is an interface unit to the operation unit (UI) 203, and outputs image data to be displayed on the operation unit 203 to the operation unit 203. Also, the operation unit I/F 207 has a role to transmit information input from the operation unit 203 by a user of the image processing apparatus to the CPU 205. A network I/F 208 connects the image processing apparatus to the LAN 219, and performs input/output of packet type information. A modem 209 connects the image processing apparatus to the WAN 220, and performs input/output of information by performing data demodulation/modulation. The devices described above are disposed on the system bus 221.

An image bus I/F 212 is a bus bridge which connects the system bus 221 and an image bus 222 which transfers image data at high-speed, and converts a data structure. The image bus 222 is formed from, for example, a PCI bus or an IEEE1394 bus. The devices described below are disposed on the image bus 222. A raster image processor (RIP) 213 analyzes PDL (page description language) code and performs so-called rendering process in which the PDL code is converted into a bit map image of a specified resolution. When the conversion is performed, attribute information is added to each pixel or each area. This processing is referred to as image area determination process. By the image area determination process, attribute information that represents an object type, such as character (text), line, graphics, or image is added to each pixel or each area. For example, an image area signal is output from the RIP 213 according to an object type of the PDL description in the PDL code. Attribute information corresponding to an attribute indicated by the signal value is stored in association with the pixel or the area corresponding to the object. Accordingly, image data is attached with the associated attribute information. A device I/F 214 connects the scanner unit 201 which is an image input device to the controller unit 204 via a signal line 223. Also, the device I/F 219 connects the printer unit 202 which is an image output device to the controller unit 204 via a signal line 224. The device I/F 214 performs synchronous/asynchronous conversion of image data. A scanner image processing unit 215 performs correction, modification, and editing on the input image data. A printer image processing unit 216 performs correction and resolution conversion on print output image data to be output to the printer unit 202 according to the printer unit 202. An image rotation unit 217 rotates the input image data so that the image is upright and outputs the resultant image data. The data processing unit 218 will be described below.

[Configuration of Processing Unit]

Figure 3:
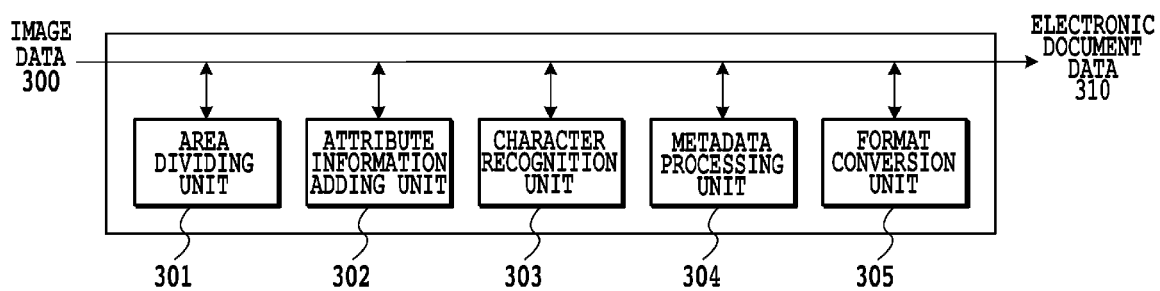
FIG. 3 is a block diagram showing a configuration example of a data processing unit.

Next, the data processing unit 218 in FIG. 2 will be described in detail with reference to FIG. 3. The data processing unit 218 includes an area dividing unit (an area extracting unit) 301, an attribute information adding unit 302, a character recognition unit 303, a metadata processing unit 304, and a format conversion unit 305. In the data processing unit 218, image data 300 scanned by the scanner unit 201 is input, and the image data 300 is processed by respective processing units 301 to 305. Thus, the processing unit 218 creates and outputs electronic document data 310. In this way, the data processing unit 218 performs document creation.

Image data scanned by the scanner unit 201 in FIG. 2 or image data (document image) stored in the storage unit 211 is input in the area dividing unit 301. The area dividing unit 301 performs extraction/grouping process on pixels in data to extract areas of objects (object areas) arranged in a page such as characters, photographs, drawings, and tables from the input image. Further, the area dividing unit 301 extracts attribute information and the sizes of the object areas, and information indicating whether or not there exists another object near the object areas, and stores the extracted information in the storage unit 211 as area information.

Figures 5A, 5B:
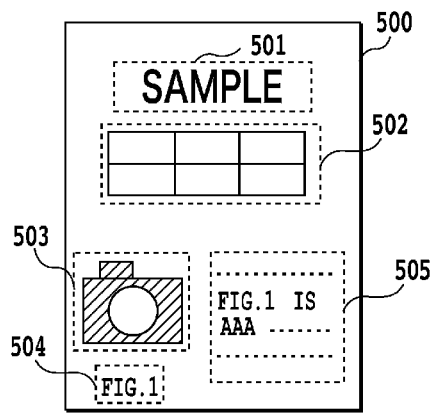
FIGS. 5A and 5B are diagrams showing an example of a result of area division performed on input image data.

In this case, as an area extraction method (object extraction method, area division method), a publicly known method can be used. According to an example method, the method binarizes an input image to create a binary image and reduces the resolution of the binary image to create a thinned image (reduced image). For example, when creating a thinned image of 1/(M×N), the method divides the binary image for each M×N pixels, if a black pixel is present in the M×N pixels, determines the pixel corresponding to the reduced image to be a black pixel, and if a black pixel is not present, determines the pixel corresponding to the reduced image to be a white pixel, thus creating the thinned image. Next, the method extracts a portion where black pixels are connected (connected black pixels) from the thinned image and creates rectangles that circumscribe the connected black pixels. If rectangles (rectangles of one character) each having a size similar to that of a character image are arrayed, or if the size of either the vertical side or the horizontal side of a rectangle is similar to the character image size (rectangle of connected black pixels in which some characters are connected) and a similar rectangle is disposed near the short side thereof, the rectangles have a high probability to be a character image which forms one character line. In this case, the rectangles are combined together, and a rectangle that represents one character line is obtained. An assembly of rectangles each having substantially the same length of the short side of the rectangle that represents one character line and arrayed at substantially equal intervals in the column direction have a high probability to be a body text. Therefore, the method combines the rectangles and extracts the body text area. Photograph areas, drawing areas, and table areas are extracted as a connected black pixel area having a size larger than that of a character image. As a result, for example, the areas indicated by reference numerals 501 to 505 in FIG. 5A are extracted. The attribute of each area is determined on the basis of its size, aspect ratio, black pixel density, a contour tracing result of white pixels contained in the connected black pixel area, and the like as described below.

The attribute information adding unit 302 adds an attribute to each area divided by the area dividing unit 301. The processing operation will be described by using an image shown in FIG. 5A as an example of input image data. In the area 505, character strings in the area has a predetermined number of characters and lines, and the character strings have a form of paragraph. Therefore, from a comprehensive viewpoint, the area 505 is determined to be a body text and an attribute of "body text" is added to the area 505. For the other areas, the attribute information adding unit 302 determines whether or not the areas include a rectangle having a size similar to the character image size. In particular, in an area including character images, rectangles of the character images appear periodically in the area. Therefore, it is possible to determine whether or not an area includes characters on the basis of the presence or absence of periodicity of appearance of the rectangles. As a result, the attribute information adding unit 302 determines that the area 501 and the area 504 are areas that include characters, and adds an attribute "character area" to metadata of these areas. However, these areas do not have a predetermined number of characters and lines, and the character strings do not have a form of paragraph. Therefore, the attribute of "body text" is not added.

On the other hand, for the areas other than the above, if the size of the area is extremely small, the area is determined to be a "noise". Further, the attribute information adding unit 302, when performing contour tracing on white pixels in the connected black pixel area having lower pixel density, if circumscribing rectangles of the white pixel contours are arranged in good order, determines the area to be a "table", and if the circumscribing rectangles are not arranged in good order, determines the area to be a "line drawing". The other areas having higher pixel density are determined to be a picture or a photograph, and an attribute "photograph" is added.

Further, if a character area that is determined not to be a body text exists near (above or below) an area of "table", "line drawing", or "photograph", the character area is determined to be a character area which explains the area of "table", "line drawing", or "photograph", so that an attribute of "caption" is added. The area to which the attribute of "caption" is added is associated with the explained area and stored in a storage means such as the storage unit 211 so that the area of "table", "line drawing", or "photograph" which is explained by the caption can be identified.

If a character area that is determined not to be a body text is larger than a character image in the body text, and is located in a position different from that of the columns of the body text, an attribute "heading" is added to the character area. If the character area is larger than a character image in the body text, and is located above the columns of the body text, an attribute of "subhead" is added. Further, if the character area is smaller than a character image in the body text, and is located at an upper edge portion or a lower edge portion of an original document, an attribute of "page" (or "page header" or "page footer") is added. If, although an area is determined to be a character area, the area is not any one of "body text", "heading", "subhead", "caption", and "page", an attribute of "character" is added.

When the attribute information adding process as described above is performed, in an example of FIG. 5A, the attribute "heading" is added to the area 501, the attribute "table" to the area 502, the attribute "photograph" to the area 503, the attribute "caption" accompanying the area 503 to the area 504, and the attribute "body text" to the area 505.

The character recognition unit 303 performs publicly known character recognition process on an area including character images (area of "character", "body text", "heading", "subhead", or "caption"). The character recognition unit 303 stores a character code string obtained by the character recognition process in the storage unit 211 as character information in association with the target area.

The position and the size of the area, information of the attribute of the area, information of the page, and character information as a result of the character recognition (character code information which are extracted by the processing of the area dividing unit 301, the attribute information adding unit 302, and the character recognition unit 303 are stored in the storage unit 211. FIG. 5B shows an example of information stored in the storage unit 211 when the processing is performed on the input image data shown in FIG. 5A. Although omitted in the explanation of FIG. 5A and the example shown in FIG. 5B, it is desired that an attribute of "character in table" is added to an area of character image in a table during the character recognition process and the information is stored as shown in FIG. 5B.

The metadata processing unit 304 stores the objects (objects of "photograph", "line drawing", "table", and the like) accompanied by a caption detected by the attribute information adding unit 302 in the storage unit 211 in association with metadata as information to search for the object.

In this embodiment, a character string written in the caption of the object and a sentence in the body text in which the same characters (words) as the characters (words) included in the caption are written are associated with each other in the metadata to search for the object.

In this embodiment, a caption identifier is used to determine a character string used as metadata to search for the object. This identifier associates an object accompanied by a caption with the caption and the character information in the body text. As a caption identifier, an ID for identifying the object (identification information), position information specifying a storage position of the caption and the character information in the body text (address or pointer indicating the recorded position), reference information (for example, XMLPath or URL), and the like can be used. In this embodiment, in a series of processing in which one page or a plurality of pages is input, IDs for uniquely identifying an object with a caption are used. For example, serial numbers or the like are used.

Hence, first, the metadata processing unit 304 creates caption identifiers for uniquely identifying the objects accompanied by a caption detected by the attribute information adding unit 302, and performs processing for adding the identifiers to the objects.

Next, the metadata processing unit 304 extracts a metadata character string corresponding to an explanatory sentence or a keyword of the object from the character information of the caption and the body text output from the character recognition unit 303, and performs processing for storing the metadata character string in the storage unit 211 in association with corresponding caption identifier. At this time, the metadata processing unit 304 adds a unique ID to the combination of the object accompanied by a caption and the metadata character string to identify the correlation between them, thus representing the correlation between them.

In this way, the metadata processing unit 304 associates the metadata with the objects accompanied by a caption detected by the attribute information adding unit 302, and stores the associated information in the storage unit 211.

The format conversion unit 305 converts the input image data 300 into a predetermined electronic document format by using the information obtained from the area dividing unit 301, the attribute information adding unit 302, the character recognition unit 303, and the metadata processing unit 304. As the electronic document format, for example, PDF, SVG, XPS, OfficeOpenXML, and the like can be used. The electronic document created by the format conversion includes page display information of graphics (display image) and content information of semantic description using characters (metadata).

Figure 4:
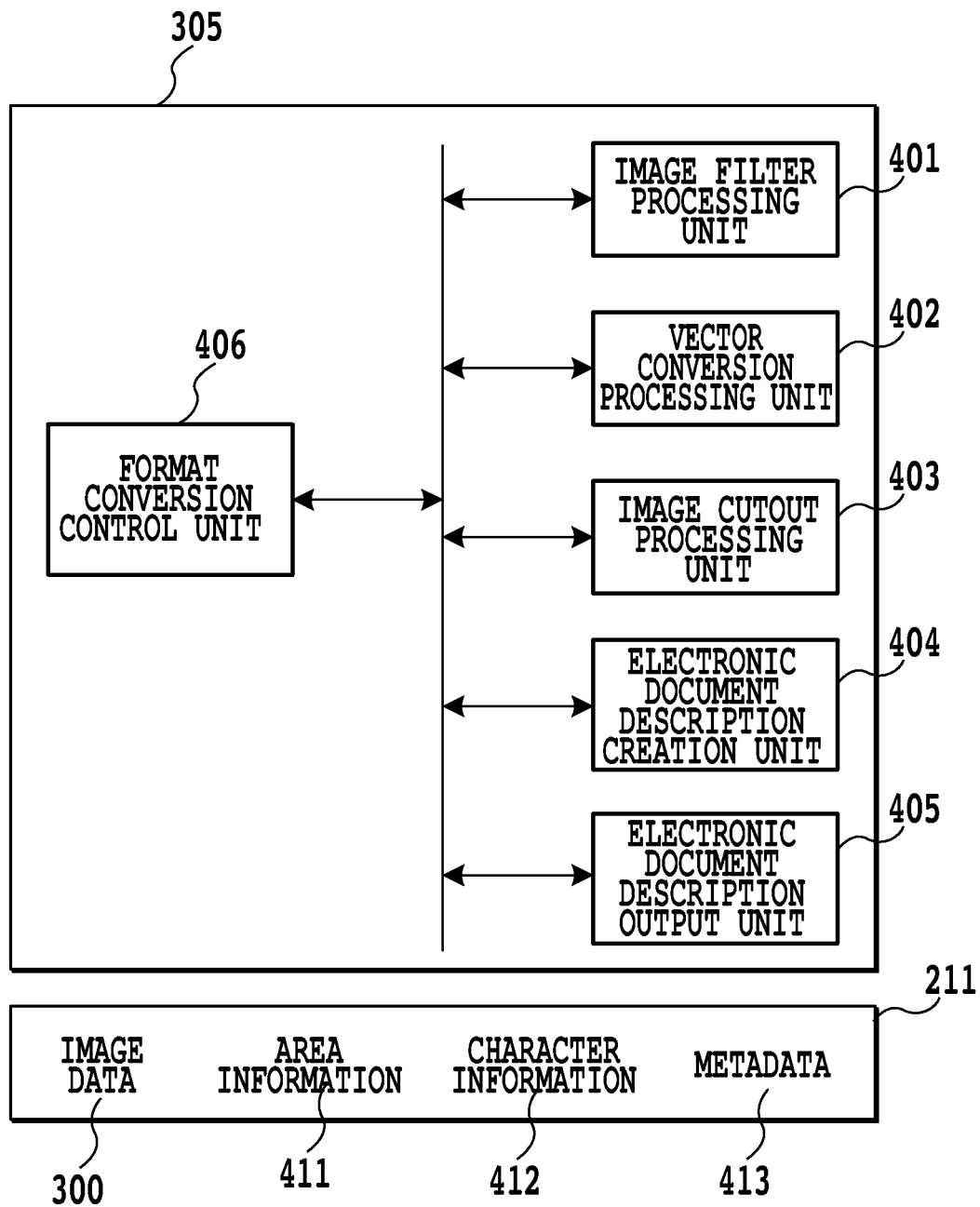
FIG. 4 is a block diagram showing a configuration example of a format conversion unit.

FIG. 4 is a block diagram showing a configuration example of the format conversion unit 305. An image filter processing unit 401 performs filtering process such as flattening, smoothing, edge enhancement, color quantization, binarization, and the like on the input image data. A vector conversion processing unit 402 converts image data (for example, an image of a portion corresponding to an area to which "line drawing" attribute is added) into graphics data (vector data) of vector path description. As a technique for converting image data into vector data, a publicly known vectorization technique can be used. An image cutout processing unit 403 cuts out image data (for example, an image of a portion corresponding to an area to which "photograph" attribute is added) as graphics data of an image part (for example, JPEG data). An electronic document description creation unit 904 creates a graphics description (vector path description) of a frame or the like displayed when identifying/highlighting a search result when an object is searched. An electronic document description output unit 405 describes graphics data, semantic description, and vector path description of a frame in a predetermined format to create an electronic document. Here, the graphics data is the data output from the vector conversion processing unit 402 and the image cutout processing unit 403. The semantic description is the character information, the metadata, and the like obtained by the character recognition unit 303 and the metadata processing unit 304. The vector path description of a frame is a description created by the electronic document description creation unit 409. A format conversion control unit 406 distributes each area in the image data 300 to the appropriate processing units 401 to 905 on the basis of area information (position, size, attribute) 411, character information 412 in the area, and metadata 413 stored in the storage unit 211 in FIG. 2. Then, the format conversion control unit 406 performs overall control of the format conversion unit 305 so that the data output from each of the processing units 401 to 404 is integrated by the electronic document description output unit 405.

Hereinafter, processing content examples of each of the processing units 401 to 405 will be described.

The image filter processing unit 401 is a processing unit for performing publicly known image filtering process such as flattening, smoothing, edge enhancement, color quantization, binarization, and the like on an image. The image filter processing unit 401 performs image processing as necessary when processing is performed by the vector conversion processing unit 402 or the image cutout processing unit 403. Although specific description is omitted, it is assumed that suitable image processing is performed when the vector conversion processing is performed and suitable image processing is performed when the image cutout processing is performed.

The vector conversion processing unit 402 converts a target pixel group in an image area such as a line drawing and table ruled lines into a graphics drawing expression by vector path drawing function, specifically into vector path description data.

An example of the vector conversion process will be described. First, an image to be converted is converted into binary image data. For example, when the image to be converted is a gray scale image, the processing to obtain binary image data is performed by binarizing brightness of each pixel by comparing the brightness with a predetermined threshold value using the image filter processing unit 401. When the image to be converted includes a plurality of colors, it is possible to divide the image into each color component and create binary image data for each color. Next, contour tracing is performed on a group of black pixels connected to each other in the binary image data to obtain a contour coordinate point array for each group. Subsequently, the contour coordinate point array is adaptively divided into a plurality of sections, and each section is approximated by a linear function or a curve function. The curve function is, for example, a spline curve or a Bezier curve. Finally, the image to be converted is converted into a vector path description including a set of a start point, linear and curve lines, and an end point.

The vectorization method is not limited to the above-described method, but any other publicly known method can be used. For example, instead of functionally approximating the contour, a vectorization method for functionally approximating a core line of a line drawing is well known.

For a target area in the input image, the image cutout processing unit 403 creates individual image part data using pixel data only in the area. When performing this processing, it is possible to change the type of the pixel data or a compression method in accordance with the characteristics of the area. For example, for an area of "line drawing" or "character" attribute, the image is converted into binary image for each color (binary image of one plane or a plurality of planes) by using the image filter processing unit 901, and thereafter the binary image is converted into data by a publicly known binary compression method such as MMR, and at the same time, data is created, to which color information corresponding to each binary image is added. On the other hand, for an area of "photograph" attribute, the image is compressed by using JPEG or JPEG2000 method that are suitable for compression of natural image.

Regarding the vector conversion by the vector conversion processing unit 402 and the image compression by the image cutout processing unit 403, it is possible to set so as to perform one of them or both of them in accordance with the attribute of the area. Regarding a character area of body text, heading, caption, and the like, when the degree of similarity of a result of character recognition is high, it is possible to describe the character code of the result of the character recognition, the size information of the character, the position information of the character, and the like, and reproduce the graphics of the character area.

The electronic document description creation unit 404 creates a graphics description (vector path description) of a frame or the like which is not displayed when browsing the electronic document and displayed in order to identify/highlight a search result when an object is searched. When creating a graphics description, the electronic document description creation unit 404 analyzes the attribute and the size of the object and a relationship with other objects to determine a method for creating an optimal highlighting frame for the object. As a creation method of the frame, there are a method which refers to a vector path description of the object and a method which refers to a vector path description of a predetermined shape (for example, rectangle or circle) which is defined in advance. For a transparent frame, it is possible to add a vector path description of an auxiliary shape for increasing recognition/identification efficiency of the object search result to the electronic document. The auxiliary shape includes, for example, an arrow notation indicating the position of the transparent frame or a metadata character string.

The electronic document description output unit 405 describes graphics data, a semantic description, and a vector path description of transparent frame in a predetermined format to create an electronic document. Here, the graphics data is data output from the vector conversion processing unit 402 and the image cutout processing unit 403. The semantic description is the character information, the metadata, and the like obtained by the character recognition unit 303 and the metadata processing unit 304. The vector path description of transparent frame is a description created by the electronic document description creation unit 404.

FIG. 6 shows an example of created electronic document data 310. The example in FIG. 6 shows an example of a case in which, when the example of the image data 500 in FIG. 5A is processed, the description is performed using an SVG (Scalable Vector Graphics) format on the basis of the data as shown in FIG. 5B stored in the storage unit 211. The descriptions 601 to 605 in FIG. 6 are respectively graphics descriptions for the areas 501 to 505 in FIG. 5A. Here, the descriptions 601, 604, and 605 are examples of character drawing description using character codes. The description 602 is a vector path description of the frame which is converted into vector. The description 603 is an example of a description for attaching a photograph image which is processed to be cut out. The description 606 is a vector path description of transparent frame (details are described later) for highlighting the photograph object 503. The transparent frame object 606 accompanied by a caption is given "1" as a caption identifier (caption_id) 608. In the examples in FIG. 5B and FIG. 6, data in the portions where symbols such as coordinate values X1, Y1, and the like are described are actually numeric values. The description 607 is an example of a metadata description. In the metadata description 607, "AAA" is described as a character string 610 extracted on the basis of the character string of the caption 609 and the character string of the body text, and the metadata description 607 is associated with the identifier 609 that is the same as the caption identifier 608. In the example of FIG. 6, although a word "AAA" is extracted from a sentence " . . . FIG. 1 is AAA . . . " which is a portion including the words "FIG. 1" in the body text and the word "AAA" is defined as the metadata 610, the metadata is not limited to words, but a sentence (for example, one sentence including "FIG. 1") may be added as the metadata without change. In the example of FIG. 6, although a character string extracted from the body text is used as the metadata, it is not limited to this, and it is possible to configure so that words extracted from the character string of the caption are further added as the metadata.

Although SVG is used as an example in the description here, the output format is not limited to SVG, but the image may be converted into PDF, XPS, Office Open XML, and the other PDL system data formats.

Hereinafter, an example of a conversion processing control of the format conversion control unit 406 will be described.

In the format conversion unit 305, content of conversion processing that should be performed on each area varies depending on the attribute of the area. For example, the vector conversion process is suitable for a drawing of black and white or several colors such as characters or a line drawing. However it is not suitable for an image area having gradation such as a photograph. Therefore, to perform an appropriate conversion in accordance with attributes of each area, correspondence tables as shown in FIGS. 7A to 7D may be set in advance.

For example, according to the setting of FIG. 7A, the vector conversion process is performed on areas of "character", "line drawing", and "table" attributes, and the image cutout process is performed on areas of "photograph" attribute.

Further, in the correspondence tables of FIGS. 7A to 7D, the presence or absence of processing for deleting pixel information of a corresponding area from the image data 300 is described. For example, a case in which an area of "character" attribute is converted into vector path description data according to the setting of FIG. 7A will be described. Since the "character" attribute is specified as deletion processing "present", processing for filling pixels corresponding to a portion covered by the converted vector path with a color of the peripheral area is performed on the image data 300. Similarly, when cutting out an area of "photograph" attribute as a rectangle image part, processing for filling a range of area corresponding to an area that is cut out with a color of the peripheral area or the like is performed on the image data 300.

A purpose of such deletion process is to make it possible to use the image data 300 as image part data of "background" after processing for each area is completed (after the filling process is completed). In the background image data (background image), portions other than the areas extracted by the area division process (for example, pixels of the base of the image data 300) remain. When describing electronic document data, a description is performed so that the graphics data (foreground image) obtained by the vector conversion processing unit 402 and the image cutout processing unit 403 is superimposed on the background image part data (background image). In this way, it is possible to configure graphics data without information loss of the background pixels (color of the base) and without redundancy.

FIG. 7B is another example of the correspondence table. According to FIG. 75, although the image cutout process in binary and the pixel deletion process from the image data 300 are performed on the "character" area, the vectorization process and the image cutout process are not performed on areas of the other attributes. Specifically, pixels other than the processing target (pixel information in the areas of "photograph", "line drawing", and "table" attributes) remain in the background image part data, and it is described so that the image part of "character" is superimposed on the background image.

FIGS. 7C and 7D are other examples of the correspondence table, and details thereof are described later.

It is possible to prepare a plurality of correspondence tables similar to those of FIGS. 7A to 7D in advance and select a table in accordance with the usage (purpose of use) of the output electronic document data or the content of the document. For example, in the output based on the correspondence table of FIG. 7A, a large part of objects are converted into the vector path description, so that image quality is good when the image is enlarged or reduced. Thus the output based on the correspondence table of FIG. 7A is suitable for reuse by a graphic editor or the like. When using the correspondence table of FIG. 7B, it is possible to reproduce the character image portion in high quality by creating individual binary images for each character color from character image and lossless-compressing the binary images, and also it is possible to increase the compression rate of data size by JPEG-compressing the portions other than the character image portion as the background image. Therefore, the case of FIG. 7B is suitable when it is desired that the compression rate is increased and data whose character image is easy to read is created.

[Flow of Processing]

Figure 8:
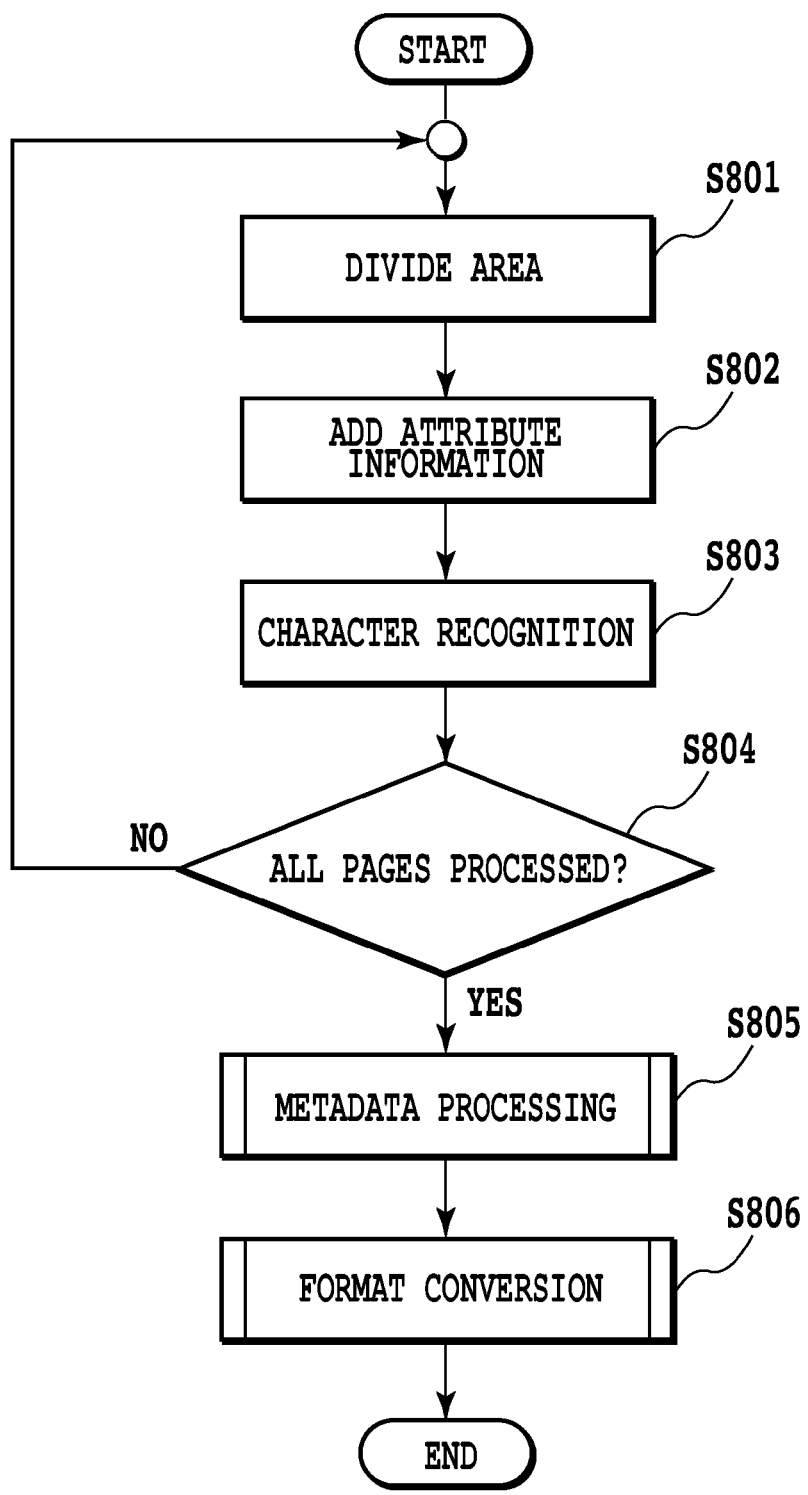
FIG. 8 is a flowchart showing an outline of the entire processing performed in the image processing system.

Next, an outline of the entire processing performed in the image processing system according to this embodiment will be described with reference to a flowchart of FIG. 8. The flowchart shown in FIG. 8 is performed by the data processing unit 218 in FIG. 2 (each processing unit 301 to 305 in FIG. 3). In this embodiment, the CPU 205 reads and executes a computer program stored in the storage unit 211, and thereby the CPU 205 functions as the data processing unit 218 (each processing unit 301 to 305 in FIG. 3), however it is not limited to this. For example, the data processing unit 218 (each processing unit 301 to 305 in FIG. 3) may be realized by hardware such as an electronic circuit.

Figures 9A, 9B:
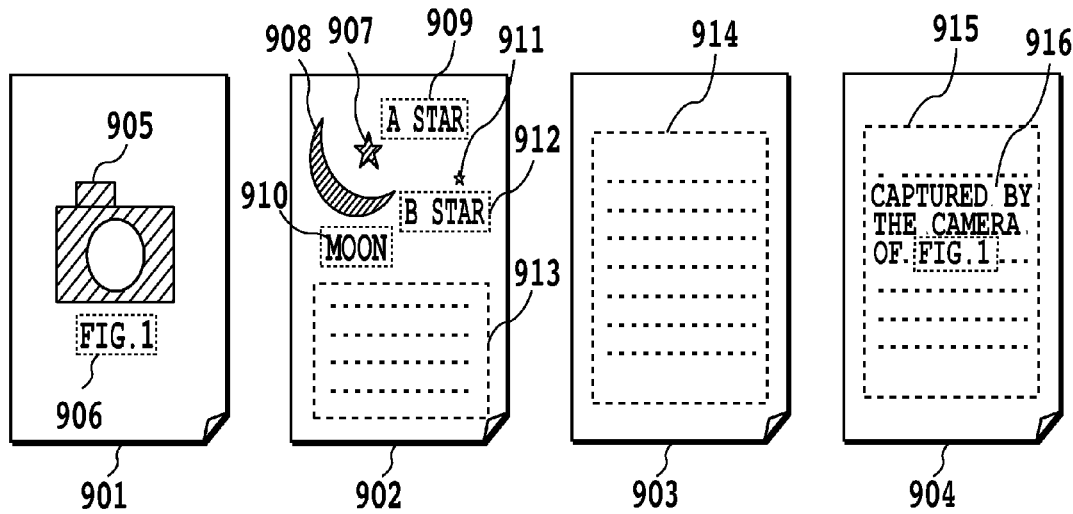
FIGS. 9A and 9B are drawings showing an example of a result of area division performed on the input image data of 4 pages.

FIG. 8 is a flowchart of processing to convert image data of a plurality of pages input by the MFP 100 in FIG. 1 into electronic document data of a plurality of pages. As the image data of a plurality of pages, it is assumed, for example, that page images 901 to 904 in FIG. 9A are input. FIG. 9A is an example of a document image including four pages, and the images 901 to 904 correspond to pages 1 to 4 respectively. Hereinafter, each step of the flowchart in FIG. 8 will be described.

In step S801, the area dividing unit 301 divides an input image data of one page into areas (objects) and extracts areas (objects). For example, the area dividing unit 301 extracts the areas 905 and 906 from the image data 901 (first page) in FIG. 9A.

In step S802, the attribute information adding unit 302 adds an attribute to each area extracted in step S801. In the example of the first page in FIG. 9A, the attribute information adding unit 302 adds an attribute of "photograph" to the area 905, and an attribute of "caption" to the area 906. The attribute information adding unit 302 also adds information indicating that the area accompanied by the caption area 906 is the area 905 to the caption area 906. In the example of the second page, an attribute of "line drawing" is added to the areas 907, 908, and 911, and an attribute of "caption" is added to the areas 909, 910, and 912. Also, the captions 909, 910, and 912 are stored in the storage unit 211 in association with information indicating that the areas accompanied by the captions 909, 910, and 912 are the areas 907, 908, and 911 respectively.

In step S803, the character recognition unit 303 performs the character recognition process on the areas to which character attributes (body text, caption, heading, subhead, and the like) are added in step S802, and holds the results as character information in association with the target areas. In the example of the first page, the character recognition unit 303 performs the character recognition process on the area to which a character attribute "caption" is added, obtains character information "FIG. 1", and associates the character information "FIG. 1" with the area 906.

In step S804, the data processing unit 218 determines whether or not the information extraction process of steps S801 to S803 is performed on all the pages. If all the pages are processed, the process proceeds to step S805. If there is a page that is not processed, the process repeats the steps from step S801.

FIG. 9B shows an example of information of the position and the size of extracted areas, page information, attribute of the area, and character information of the area, as a result of processing of steps S801 to S804 performed on the images 901 to 904 in FIG. 9A. The areas 913 to 915 are areas of "body text" attribute extracted from the second to the fourth pages respectively. The information described above is stored in the storage unit 211.

In step S805, the metadata processing unit 304 performs metadata extraction process and metadata adding process. The details of the processing performed by the metadata processing unit 304 in step S805 will be described with reference to a flowchart in FIG. 10.

Figure 10:
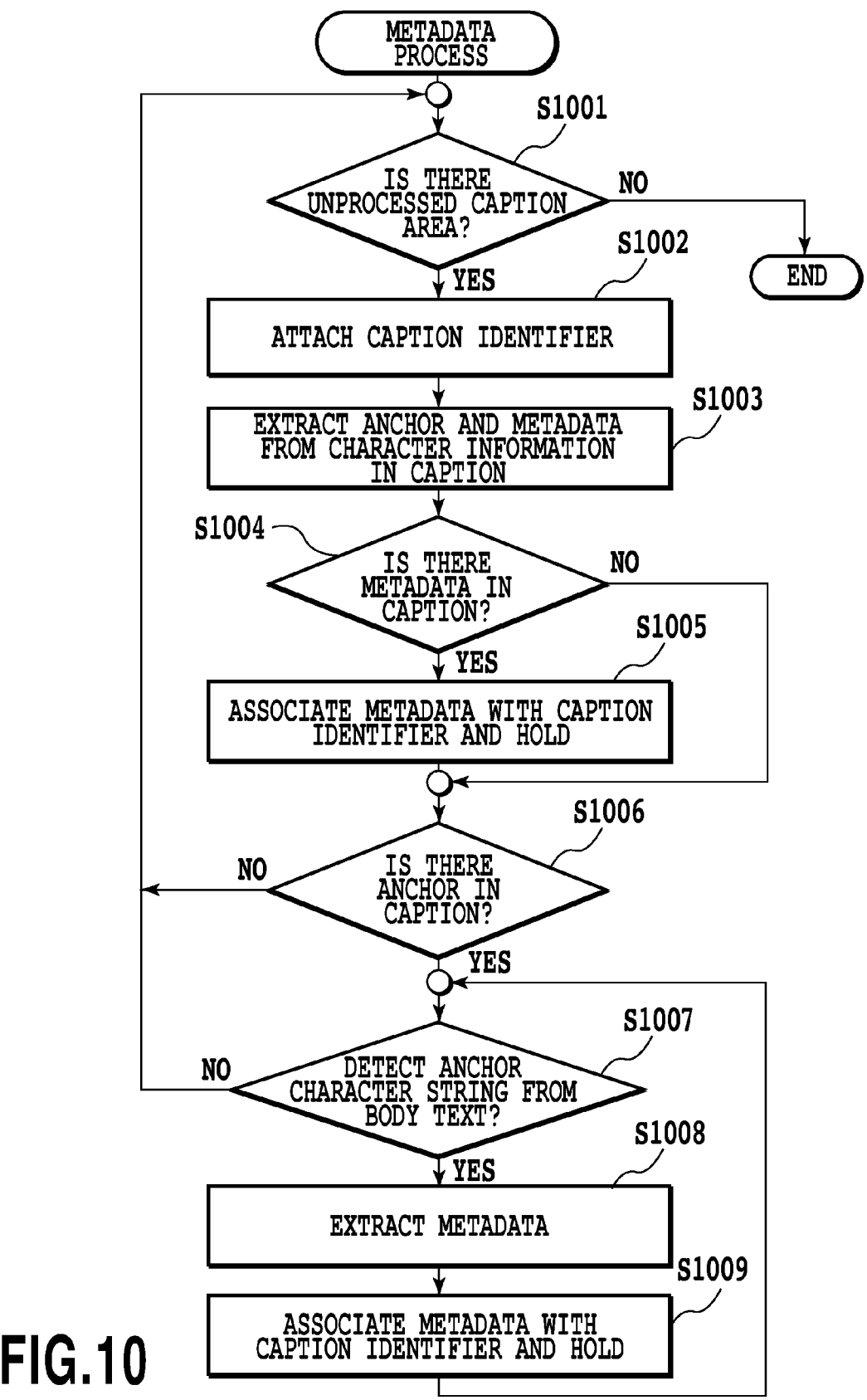
FIG. 10 is a flowchart for explaining processing of a metadata processing unit.

In step S1001 in FIG. 10, the metadata processing unit 304 selects one area on which the metadata processing is not performed from among the areas to which the "caption" attribute is added in the area information stored in the storage unit 211. In other words, if there is a caption area which is not processed, the caption area which is not processed is selected as a processing target, and the process proceeds to step S1002. If there is no caption area or all the caption areas have been processed, the metadata processing ends. When the images 901 to 904 in FIG. 9A are input, the caption area 906 is selected first, and then the caption areas 909, 910, and 912 are sequentially selected.

In step S1002, the metadata processing unit 304 adds a caption identifier to the object accompanied by caption of the processing target, and secures a metadata storage area for the added caption identifier in the storage unit 211. Here, a caption identifier "1" is added to the photograph object 905 accompanied by the caption 906, and a metadata storage area for the caption identifier "1" is secured in the storage unit 211.

In step S1003, the metadata processing unit 304 extracts an anchor character string and a metadata character string from character recognition information in the caption area. The anchor character string is character information for identifying the object accompanied by this caption in the original document. The metadata character string is character information for explaining the object. In the caption accompanying the object, only the anchor character string may be written, only the metadata character string may be written, or both character strings may be written. For example, in many cases, the anchor character string is a figure number which combines a specific character string such as "Figure" or "Fig" with a number or a symbol. Therefore, it is desired to prepare an anchor character string dictionary that registers the specific character strings in advance, and specify an anchor portion (anchor character string+number or symbol) by comparing the caption character string with the dictionary. The character string other than the anchor portion among the character strings in the caption area may be identified as a metadata character string. For example, when the caption is "FIG. 1 Camera", "FIG. 1" corresponds to the anchor character string and "Camera" corresponds to the metadata character string.

In step S1004, the metadata processing unit 304 determines whether or not the metadata character string is extracted from the caption area in step S1003. If the metadata character string is extracted, the process proceeds to step S1005, and if the metadata character string is not extracted, the process proceeds to step S1006.

In step S1005, the metadata processing unit 304 stores the metadata character string extracted from the caption area in the storage area for the caption identifier added in step S1002, and the process proceeds to step S1006. In other words, the metadata processing unit 304 associates the metadata character string extracted from the caption area with the caption identifier.

In step S1006, the metadata processing unit 304 determines whether or not the anchor character string is extracted from the caption area in step S1003. If the anchor character string is extracted, the process proceeds to step S1007. On the other hand, if the anchor character string is not extracted, the process returns to step S1001, and the metadata processing unit 304 determines whether or not there is a caption area which is not processed.

In the first page 901 of the input example in FIG. 9A, although "FIG. 1" is extracted from the caption area 906 as the anchor character string, no metadata character string is extracted, so that the process proceeds from step S1004 to step S1006 to step S1007.

In step S1007, the metadata processing unit 304 detects the same character string expression as the extracted anchor character string from the character information in "body text" area stored in the storage unit 211. If the metadata processing unit 304 detects the same character string expression, the process proceeds to step S1008. If the metadata processing unit 304 does not detect the same character string expression, the process returns to step S1001, and the metadata processing unit 304 determines whether or not there is a caption area which is not processed.

In step S1008, the metadata processing unit 304 extracts a character string corresponding to the metadata of the object from an area around the character string expression detected from the body text in step S1007. In the input example of FIG. 9A, the same character string 916 as the anchor character string "FIG. 1" 906 is detected from the body text area 915, so that a morphological analysis or the like is performed on the character string "is captured by the camera in FIG. 1". located around the character string 916, and a word "camera" is extracted as the metadata character string. To determine the metadata character string, a word extracting function may be used in a morphological analysis of natural language processing. Although an example in which a word is extracted to be the metadata character string is described in this embodiment, it is not limited to this, and for example, one sentence including the anchor character string may be used as the metadata character string without change.

In step S1009, the metadata processing unit 304 additionally stores the metadata character string extracted in step S1008 in the storage area for the caption identifier. In other words, the metadata processing unit 304 associates the metadata character string extracted from the body text with the caption identifier. Then, the process returns to step S1007, and the metadata processing unit 304 repeatedly determines whether or not there is a description of the same anchor character string in the other portions of the body text. If there is the same anchor character string, the metadata processing unit 304 additionally stores the anchor character string. Therefore, there is a case in which a plurality of metadata character strings is associated with one caption identifier.

Returning to FIG. 8, in step S806, the format conversion unit 305 converts the image data 300 into the electronic document data 310 on the basis of the information stored in the storage unit 211 as shown in FIG. 9B. As described in FIG. 4, the format conversion unit 305 performs format conversion process on the area in the image data 300 of FIG. 4 by the control of the format conversion control unit 406 in accordance with the correspondence table in which conversion processing methods that should be performed on each area are described. Here, a flow of the format conversion process when the conversion is controlled using the correspondence table of FIG. 7C will be described with reference to a flowchart of FIG. 11.

Figure 11:
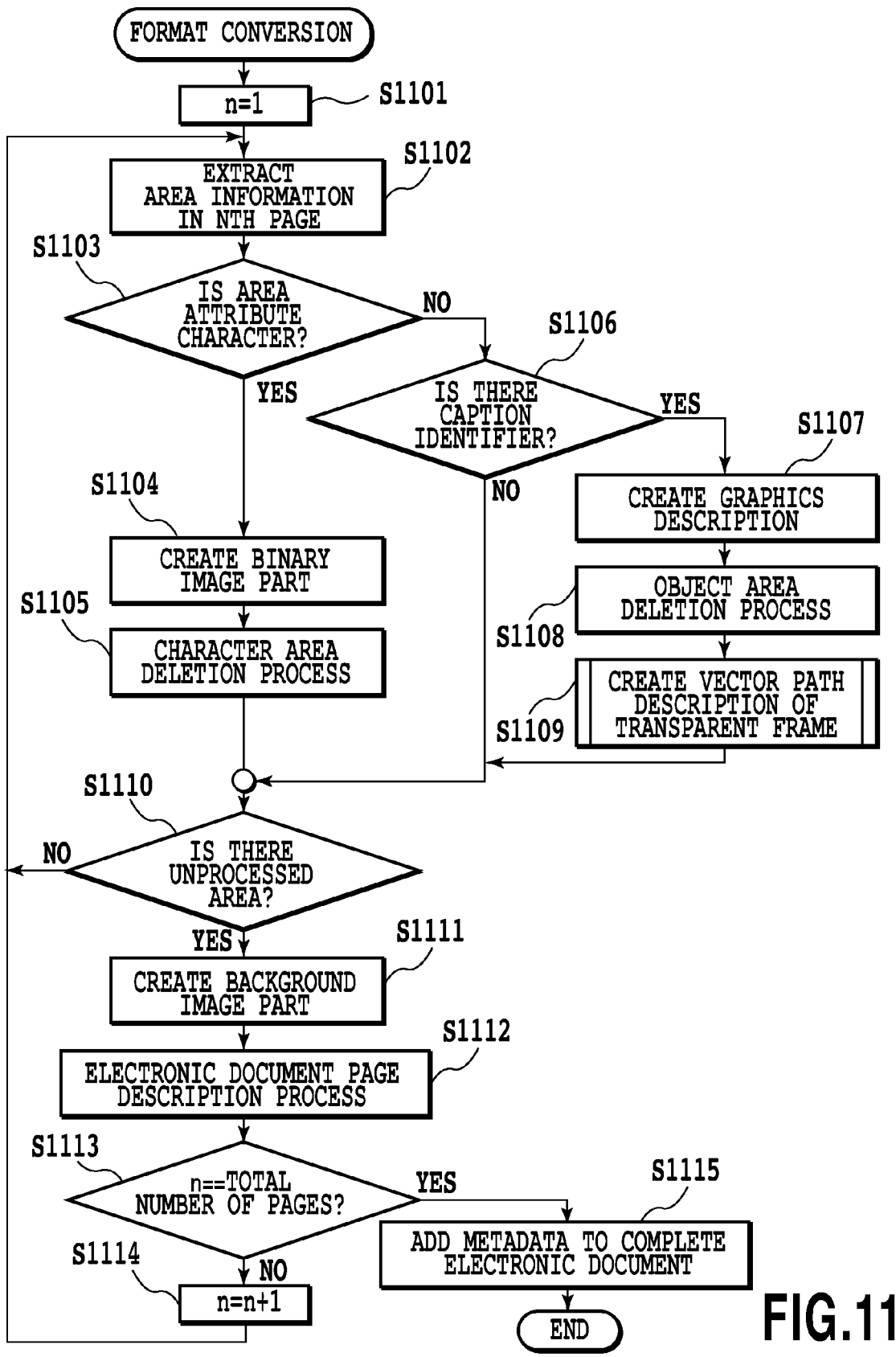
FIG. 11 is a flowchart for explaining processing of the format conversion unit.

In step S1101 in FIG. 11, the format conversion control unit 406 initializes a counter n of a processing page number to one.

In step S1102, the format conversion control unit 406 selects one of unprocessed areas as a processing target area from nth page data in the area information 411 in FIG. 4.

In step S1103, the format conversion control unit 406 checks the attribute of the processing target area referring to the correspondence table, and branches the process according to each attribute. In this example, the format conversion control unit 406 performs determination using the correspondence table of FIG. 7C, so that it determines whether the area is character or not. Specifically, when the attribute is character ("body text", "caption", "page" or "heading"), the process proceeds to step S1104, and when the attribute is "photograph", "line drawing", or "table", the process proceeds to step S1106.

In step S1104, in accordance with the setting of the correspondence table of FIG. 7C, the image cutout processing unit 403 creates a binary image (binary image part) of a portion corresponding to the "character" attribute area of the processing target in the image data 300. The created binary image part is compressed in, for example, PNG format, and stored in the storage unit 211 in FIG. 2. Character color information obtained separately from a certain character pixel in the image data 300 is added to pixels corresponding to a character line in the binary image part, and transparent color is provided to the other pixels.

In step S1105, since a deletion processing instruction of character area is set in FIG. 7C, the format conversion control unit 406 performs the deletion process for filling pixels corresponding to a character portion in the image data 300 of FIG. 4 with a color of the peripheral pixels.

On the other hand, in step S1106, the format conversion control unit 406 checks whether or not the caption identifier is added to the area determined to be "photograph", "line drawing", or "table" in step S1103. If the caption identifier is added, the process proceeds to step S1107, and if not added, the process proceeds to step S1110.

In step S1107, the image cutout processing unit 403 and the vector conversion processing unit 402 in FIG. 4 create a graphics description in accordance with the setting of the correspondence table of FIG. 7C. Specifically, an image part description is created by the image cutout for the area to which the "photograph" attribute is added, and a vector path description is created by the vector conversion for the area to which the "line drawing" or "table" attribute is added.

In step S1108, in accordance with the setting of the correspondence table of FIG. 7C, the format conversion control unit 406 performs the deletion process for filling pixels corresponding to "photograph", "line drawing", or "table" in the image data 300 of FIG. 4 with a color of the peripheral pixels.

In step S1109, in accordance with the setting of the correspondence table of FIG. 7C, the format conversion control unit 406 causes the electronic document description creation unit 404 to create vector path description data corresponding to a frame circumscribing the processing target area. Further, in step S1109, the format conversion control unit 406 adds the caption identifier of the processing target area to the created vector path description data of the frame, and assigns a transparent color as a drawing color of the vector path description data of the frame. The vector path description data created in this way is stored in the storage unit 211 in FIG. 2. The details of the vector path description data creation process of a transparent frame performed by the electronic document description creation unit 404 in step S1109 will be described with reference to a flowchart in FIG. 12.

Figure 12:
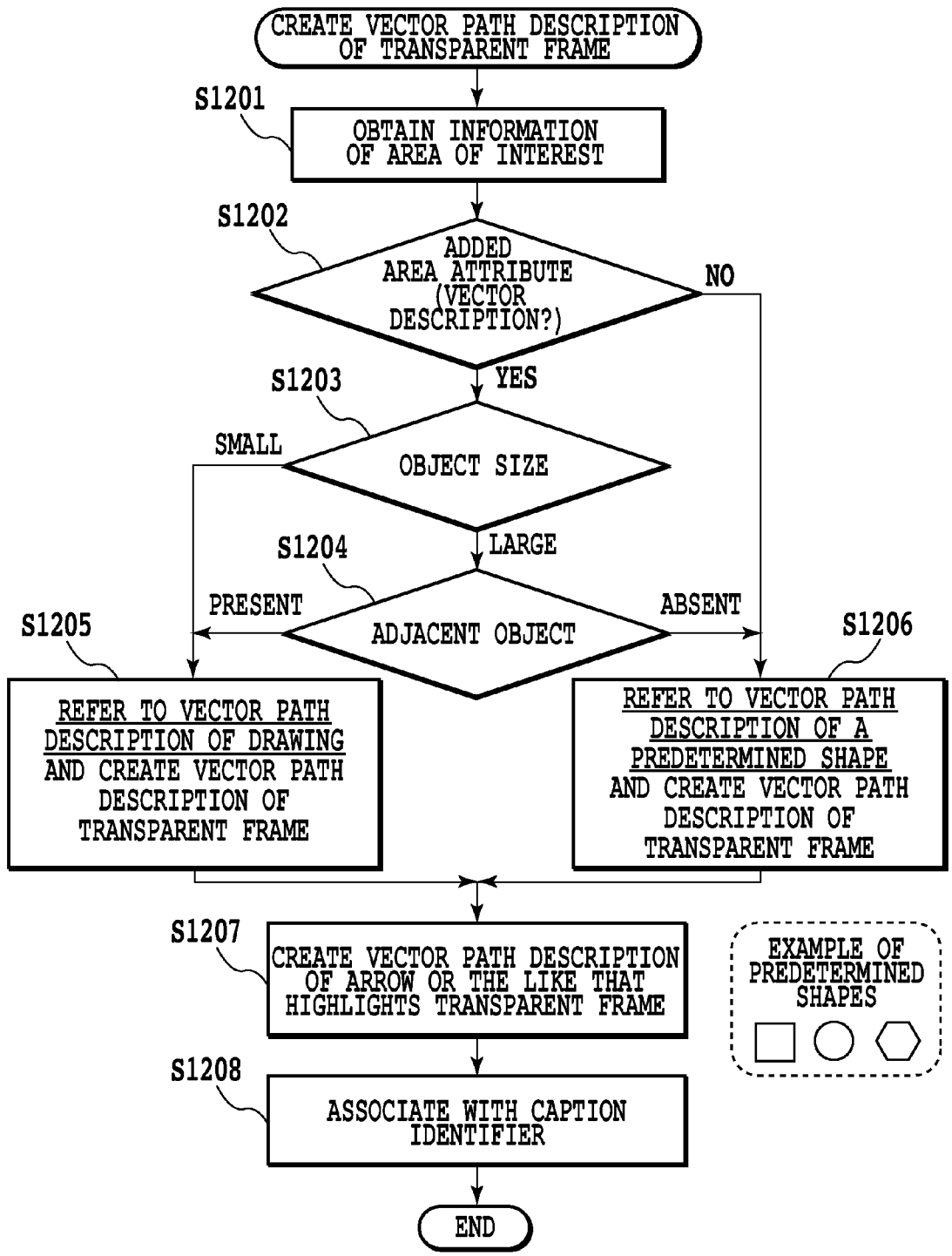
FIG. 12 is a flowchart for explaining processing of an electronic document description creation unit.

In step S1201 in FIG. 12, the electronic document description creation unit 404 obtains area information which is information related to the object accompanied by the caption of the processing target. The area information includes, for example, the position and the size of the area, the attribute of the area, adjacent object information, and the like. The information described above is stored in the storage unit 211.

In step S1202, the electronic document description creation unit 404 determines whether or not the processing target area is expressed in the vector path description. If it is expressed in the vector path description (for example, in a case of an area to which "line drawing" or "table" attribute is added), the process proceeds to step S1203, and if not expressed in the vector path description (for example, in a case of an area to which "photograph" attribute is added), the process proceeds to step S1206. For example, a case in which the page images 901 to 904 in FIG. 9A are used as an input document will be described. When processing the objects 907, 908, and 911 to which "line drawing" attribute is added, the process proceeds to step S1203, and when processing the object 905 to which "photograph" attribute is added, the process proceeds to step S1206.

In step S1203, the electronic document description creation unit 404 compares the size of the processing target area with a predetermined threshold value. When the size of the processing target area is smaller than the predetermine threshold value (for example, in a case of the object 911 in FIG. 9A), the process proceeds to step S1205, and when the size is the predetermine threshold value or more (for example, in a case of the object 907 or 908 in FIG. 9A), the process proceeds to step S1204. In this way, the process branches in accordance with the size of the processing target area.

In step S1209, the electronic document description creation unit 904 determines whether or not there exists another object near the processing target area. If there exists another object (for example, the objects 907 and 908 in FIG. 9A), the process proceeds to step S1205, and if not exists, the process proceeds to step S1206. In this way, the process branches depending on whether or not there exists another object near the processing target area.

As described above, according to the processing in steps S1202, S1203, and S1204, the process after this branches depending on the area information (the attribute information and the size of the processing target area, and whether or not there exists another object near the processing target area). As a result of the branches, the description method of the vector path description of transparent frame described later is changed. The transparent frame is a frame which has a transparent color and circumscribes the object.

In step S1205, the electronic document description creation unit 404 creates a vector path description of transparent frame by referring to (reusing) the vector path description data of the processing target object created in step S1107 in FIG. 11. The vector path description data of transparent frame includes a parameter description such as a reference instruction to the vector path description data of the object, enlargement of the frame, movement of the frame position, the size of the frame, and a highlighting color of the frame. At this time, a parameter of enlargement is set so that the size of the frame is larger than the vector path description of the object by several pixels. It is desired to be set so that, when the vector path description of the object is referred to, a vector path description of a portion representing the outer contour of the object is referred to. In other words, the vector path description data of the frame has a shape similar to the shape of the object, and is described in a size larger than the size of the object by several pixels. The vector path description data of transparent frame may have a parameter to blink the frame when highlighting the frame. A transparent color is assigned as a color when normally drawing the frame from the vector path description data of the frame. Since the transparent color is used, the drawing result of the vector path description of the frame does not affect visibility of the page on which the frame is drawn when a normal display is performed. When a certain object is detected as a search result, the frame can be highlighted according to the above-described parameter description by adding a highlighting color to the transparent frame circumscribing the object, thickening the frame, or blinking the frame. As a result of the highlight display, it is possible to recognize the object detected through the search as a search result.

Figure 15B:
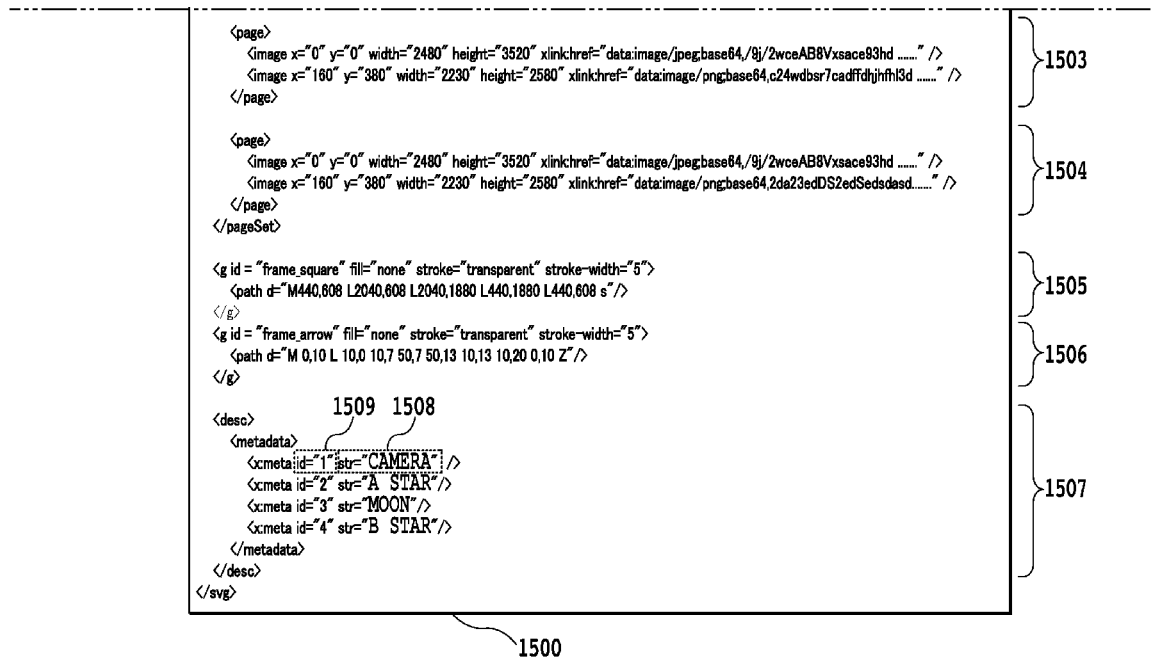

Here, an example of the vector path description of transparent frame created for the object 907 in FIGS. 9A and 9B will be described with reference to FIGS. 15A and 15B showing a description example of electronic document data. In a description 1512 that is the vector path description of the object 907, an ID (vec_img1) for referring to the description is added and described. A description 1515, which is the vector path description of transparent frame, is described using a description (use command) for referring to the reference ID and a parameter description. As a result, the vector path description of transparent frame is created by referring to (using) the vector path description data of the object. The details of the vector path description of transparent frame will be described later.

On the other hand, in step S1206, the electronic document description creation unit 404 creates the vector path description data of transparent frame by referring to (using) vector path description data of a predetermined shape (for example, rectangle, circle, hexagon, or the like) which is defined in advance. Therefore, the vector path description data of transparent frame includes a parameter description of a reference instruction to the vector path description data of the predetermined shape. The vector path description of transparent frame is described so that the transparent frame is slightly larger than the circumscribed figure of the processing target object (for example, a space corresponding to 5 pixels is provided around the circumscribed figure of the object). The transparent color is assigned as a drawing color of the vector path description data of the frame. In this way, by describing the vector path description of transparent frame so that the transparent frame is slightly larger than the circumscribed figure of the object, when the drawing result of the vector path description of the frame is highlighted, the object circumscribed by the frame is easy to be viewed.

For example, when creating the vector path description of transparent frame for the object 905 in FIGS. 9A and 9B, a vector path description of a rectangle (reference ID: frame_square) defined as a predetermined shape in the description 1505 in FIG. 15B is used. Then, the vector path description of transparent frame 1511 is created by using a description (use command) that refers to the reference ID and a parameter description. The details of the vector path description of transparent frame will be described later.

According to the processing described above, a description method of the vector path description of transparent frame (S1205 or S1206) is selected in accordance with the attribute information and the area information of the processing target area. In other words, the vector path description of transparent frame is created in a shape in accordance with the area information and the like. As a result, when highlighting the frame circumscribing the object detected as a result of a search, it is possible to make it easy to view the object.

Even when the area (object) is small, it is possible to highlight the frame so as to easily recognize which object is detected through the search, by changing the description method of the vector path description of transparent frame in accordance with the size of the area.

The description method of the vector path description of transparent frame is changed depending on whether or not there exists another object near the area, so that even when there exists another object near the area, the object detected through the search is difficult to be mistaken as another object.

In step S1207, the electronic document description creation unit 404 creates an additional vector path description of a transparent shape for further complementarily highlighting (indicating) the frame (or object) created in steps S1205 and S1206. As an example of the transparent shape, a description of an arrow or the like to indicate the object position in an easily understood manner is considered. In this case, it is possible to describe a vector path description of a shape of an arrow or the like necessary for an additional description as one of predetermined shapes in advance, and include a reference of this vector path description in the vector path description of transparent frame. When the frame is highlighted, the transparent shape of the arrow or the like is also highlighted in the same manner. It is desired that a description of a parameter to specify a highlighting color for highlighting the transparent shape is included in the vector path description of transparent frame. To perform a complementary highlight display, it is possible to refer to the metadata (character code) added to the object from the vector path description of transparent frame and draw a character string for explaining the object using the highlighting color.

In step S1208, the electronic document description creation unit 404 adds the caption identifier of the processing target area to the created vector path description data of the frame. The created vector path description data of the frame is stored in the storage unit 211 in FIG. 2.

Returning to FIG. 11, in step S1110, the format conversion control unit 406 determines whether or not there is an unprocessed area in the nth page. If an unprocessed area remains, the process returns to step S1102, and the processing of steps S1102 to S1109 is repeated. If the entire area of the nth page has been processed, the process proceeds to step S1111.

In step S1111, the format conversion control unit 406 performs processing for filling a portion of the area cut out by the image cutout processing unit 403 with a color of the peripheral area, on the image data 300 in FIG. 4, and creates a background image part. Specifically, the pixels of "character" area (pixels corresponding to a character line) cut out from the image data 300 in step S1105 as an image part are filled with a color of the peripheral area and deleted. The pixels of "photograph", "line drawing", and "table" areas which are cut out from the image data 300 as an image part are filled with a color of the peripheral area and deleted. The other areas (for example, base portions or the like) remain unprocessed. In this example, the resolution of the background image part is further reduced to ½, then the background image part is converted into image data on which JPEG compression is performed, and the image data is stored in the storage unit 211 in FIG. 2. However, the background image part may be processed by other image processing such as smoothing, and compressed in another format.

FIGS. 13A and 13B are examples of the image parts and the vector path description data created when the processing of steps S1101 to S1111 is performed on the image data in FIG. 9A. FIG. 13A and FIG. 13B are results of processing the image data 901 in the first page and the image data 902 in the second page, respectively. Reference numerals 1301 and 1304 denote examples of the background image part created in step S1111. Since portions of character images and portions of cut out objects are filled with a color of the peripheral area and deleted, the background image parts 1301 and 1309 are configured by one plane of image including all other than the above portions. Reference numerals 1302 and 1305 denote examples of the binary image part of character portions created in step S1104 and the graphics description data created in step S1107. Regarding the binary image part of character portions, information of character color is separately stored, so that a portion of character line is configured by pixels of character color, and the other white portion is configured by pixels of transparent color. The dashed lines corresponding to the outer frames of the image part 1302 and the graphics description 1305 are provided for convenience of illustration, and the actual image part may be configured with an area of a minimum rectangle circumscribing the character portions and the graphics description data portions. Reference numerals 1303 and 1306 denote examples of the vector path description data of the frame created in step S1109 (each processing in FIG. 12). Although the vector path description of the frame is drawn with a black thick line in FIGS. 13A and 13B for convenience of illustration, actually, the vector path description of the frame is a vector path description using a transparent color, so that it is not visible. The dashed lines corresponding to the outer frames of the vector path descriptions 1303 and 1306 are provided for convenience of illustration, and thus there is no actual data for the dashed lines.

In step S1112, the format conversion control unit 406 causes the electronic document description output unit 405 to perform processing to describe the page currently processed as an electronic document page 310 in a predetermined format. FIG. 14 shows an example of electronic document page described with respect to the image 901 of the first page in FIG. 9A. Reference numeral 1400 in FIG. 14 denotes an example in which the electronic document page is described in an SVG (Scalable Vector Graphics) format. The electronic document page 1400 includes a background image data description 1401, a character portion binary image part description 1402, a vector path description of transparent frame 1403, and a vector path description 1404. The background image data description 1401 is a description created in step S1111 in FIG. 11. The character portion binary image part description 1402 is a description created in step S1104. The vector path description of transparent frame 1403 is a description created in step S1109. The vector path description 1404 is a description defining a predetermined shape referred to when the processing of step S1206 in FIG. 12 is performed.

In the vector path description 1403, by describing <use xlink:href="frame_square">, a predetermined shape defined in the vector path description 1404 described later is referred to (reused). By specifying a drawing position and the size by a description <transform="translate (100,100) scale(2)">, a frame drawn with a transparent color is created. Further, <id="frame_square"> in the vector path description 1404 is a description to refer to an ID of a template defined as a predetermined shape, and <stroke="transparent"> is a description to draw a frame with a transparent color. This means that a figure of a shape formed by a vector path description <d="M440,608 L2040,608 L2040,1880 L440,1880 L440, 608 s"> is drawn with a transparent color. The vector path description of a predetermined shape is not limited to a rectangle, but the shape can be freely defined, such as circle and hexagon, and it is possible to prepare a plurality of shapes and use any one of them as necessary. The descriptions 1401 to 1403 are graphics drawing descriptions corresponding to reference numerals 1301 to 1303 in FIG. 13A, respectively, and the descriptions are constructed as graphics data in which they are drawn sequentially in a superimposed manner starting from the description 1401. Specifically, the background image is drawn on the bottom, the character images are drawn thereon, and further the transparent frames are drawn thereon. The caption identifier 1405 is added to the vector path description of transparent frame (graphics description) 1403.

In step S1113, the format conversion control unit 406 determines whether or not the page number n currently processed is the same as the total number of pages which is the page number of the last page. If the page number n is the same as the total number of pages, the format conversion control unit 406 determines that the conversion process of all the pages is completed, and the process proceeds to step S1115. If n is smaller than the total number of pages, the process proceeds to step S1114, one is added to n, the process returns to step S1102, and the format conversion control unit 406 repeats the processing on the next page.

Finally, in step S1115, the electronic document description output unit 405 integrates each electronic document page described in step S1112 into one document and adds a description of metadata to create the output electronic document data 310. As a result, the electronic document description output unit 405 creates electronic document data including the vector path description of transparent frame described above and the like.

FIGS. 15A and 15B are description examples of the output electronic document data. In the output electronic document data 1500, the descriptions 1501 to 1504 are electronic document page descriptions of the first to the fourth pages, respectively. The description 1505 is a vector path description of a rectangle for the transparent frame, and a reference ID is assigned by the description <id="frame_square">. The description 1506 is a vector path description of an arrow defined for an additional description, and a reference ID is assigned by the description <id="frame arrow">. The description 1507 is a description example of metadata, in which caption identifiers and metadata character strings are described in association with each other. The descriptions 1512 to 1514 are vector path descriptions of the objects created in step S1107 in FIG. 11. An ID referred to from the vector path description of transparent frame is automatically assigned to these vector path descriptions of the objects. For example, a reference ID is assigned to the vector path description 1515 of the object 907 by the description <id="vec_img1">. The description 1511 and the descriptions 1515 to 1517 are the vector path descriptions of the transparent frame, which are uniquely identified by the caption identifier "caption_id". Each transparent frame refers to a vector path description of a predetermined shape or a vector path description of an object by the description <use xlink: href="reference ID">. A parameter description specifying the drawing position and the size are also described in the vector path descriptions. The metadata character string "camera" 1508 in the metadata description 1507 is described in association with the caption identifier 1509. The caption identifier is the same as the caption identifier 1510 added to the vector path description 1511 of the transparent frame in the first page. In this way, the metadata 1508 and the vector path description 1511 of the transparent frame are associated with each other via the caption identifiers 1509 and 1510, as described later, when a search is performed using a keyword "camera", the vector path description 1511 of the transparent frame can be searched.

The above description is an explanation of the electronic document data creation process according to the first embodiment of the present invention.

[Search for Object]

Next, an example of searching for an object using the above-described metadata as a keyword in the electronic document data 310 created in this embodiment will be described with reference to FIGS. 16A to 16D.

FIGS. 16A to 16D are examples of display screen (GUI) of software executed by the client PC 101 in FIG. 1 or other client PCs as an application to search for an object (hereinafter, object search application). As such software, for example, Adobe Reader (trademark) can be used when a format of a document to be created is PDF.

When a character string input in an input field 1601 as search words matches the metadata added to the electronic document data, the object search application highlights the vector path description including a caption identifier associated with the metadata.

Figure 16A:
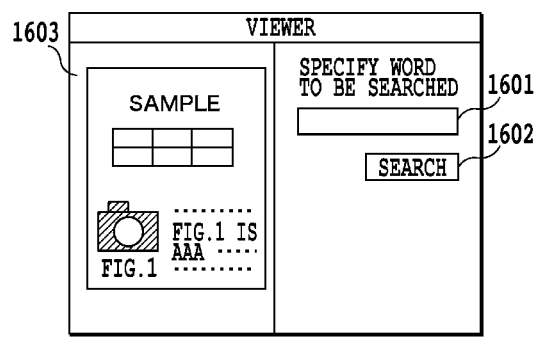
FIGS. 16A to 16D are screen display examples of an application for browsing/searching electronic document data.

FIG. 16A is an example of a display screen when the document of FIG. 5A is displayed by the application. Reference numeral 1601 denotes an input field for entering (specifying) words to be searched. Reference numeral 1602 denotes a search execution button for executing the search after the words to be searched is entered. Reference numeral 1603 denotes an area for displaying a drawing result of the electronic document data 600 in FIG. 6. The display content thereof is a drawing result of the graphics descriptions 601 to 605.

Figure 16B:
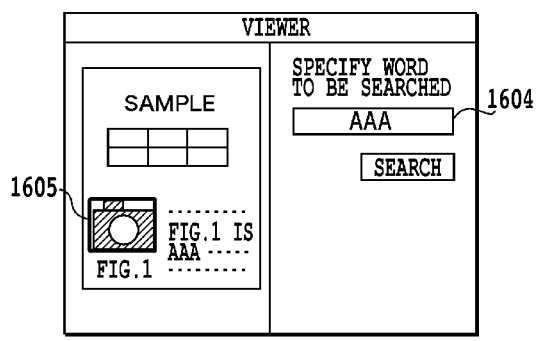

FIG. 16B shows a result of execution of the search. Reference numeral 1604 denotes a state in which "AAA" is specified as the words to be searched. In the electronic document data 600 in FIG. 6, the character string "AAA" (610) in the metadata description 607 and the character string "AAA" in the character drawing description 605 match the search word, so that the application performs an operation when hitting in the search. Here, an operation example when the character string 610 in the metadata description 607 is hit will be described.

The object search application detects the caption identifier 609 of metadata which matches the search word, and further detects the graphics description 606 to which the identifier 608 is added which is the same as the caption identifier 609 from the electronic document 600. Then, when displaying a page, the object search application draws the target graphics description so that corresponding portions are highlighted. In this example, the graphics description is pasting of images, so that the object search application displays the object by adding a frame of highlighting color, for example, a red frame around the image object. Reference numeral 1605 in FIG. 16B denotes a state in which a portion of the object that is hit as a result of execution of the search is highlighted by a red frame.

Figure 16C:
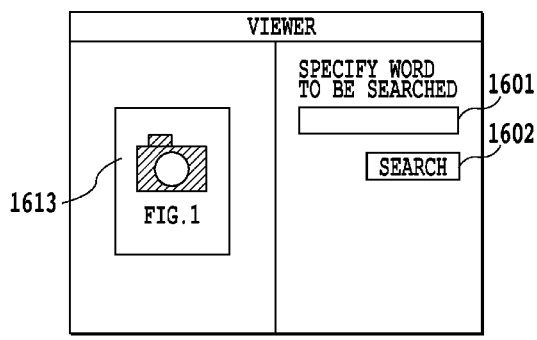

FIG. 16C shows a state of a screen showing the first page of the electronic document data 1500 of FIGS. 15A and 15B created by performing the processing of the flowchart of FIG. 11 on the image data 901 to 904 of 4 pages in FIG. 9A on the basis of the correspondence table in FIG. 7C. The display content is a drawing result of the graphics description 1501 of the first page, and is equivalent to an image in which the character image (foreground image) 1302 in FIG. 13A and FIG. 13B is displayed in a superimposed manner on the background image 1301. Since a transparent color is specified for the frame vector path description 1303, the frame is not visible in a normal condition.

Figure 16D:
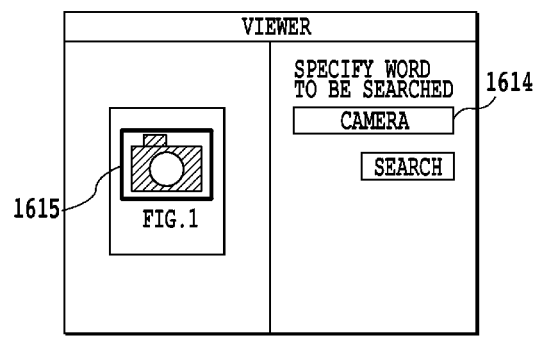

FIG. 16D shows a result of performing a search on the electronic document data 1500 displayed in FIG. 16C. In an input field 1614, "camera" is entered as a word to be searched. In the electronic document data 1500, the character string "camera" 1508 in the metadata description 1507 matches the search word, so that the application performs an operation when hitting in the search. Specifically, in the same manner as in the above description, the object search application detects a graphics description to which the same value as that of the caption identifier 1509 of the matched metadata 1508 is added, and highlights a corresponding portion when displaying the page. In this case, the vector path description of transparent frame 1511 to which the caption identifier 1510 is added is to be highlighted, so that the frame of the vector path description 1511 is drawn with a highlighting color (for example, red) instead of the transparent color specified originally. Therefore, as indicated by reference numeral 1615, a graphics description corresponding to metadata hit in the search is superimposed and displayed as a highlighted frame in a visible state with a red color or the like on the document image. For a user, the photograph portion in the background image can be seen as if the portion were hit in the search. The highlighting method is not limited to this, but other frame colors or other shapes defined as predetermined shapes may be used. The frame may be blinked. When the description of the hit object is represented by a vector path description instead of pasting image, a frame shape formed by reusing the vector path description may be used.

An example in which this method improves the search result visibility (recognition of the hit object and identification (discrimination) of what the object is) will be described with reference to FIGS. 17A to 17D, which show results of performing a search on the electronic document 1500 of FIGS. 15A and 15B when the visibility is not considered (FIGS. 17A and 17C) and when the visibility is considered and a control of transparent frame is performed (this method: FIGS. 17B and 17D).

Figure 17A:
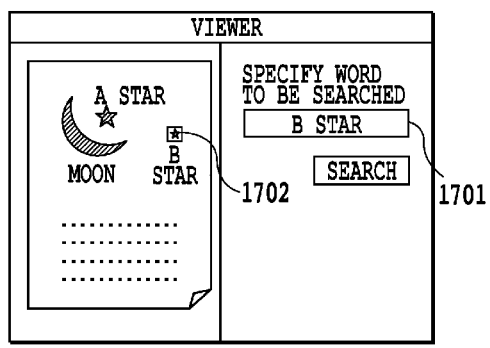
FIGS. 17A to 17D are screen display examples of the application for browsing/searching electronic document data.
Figure 17B:
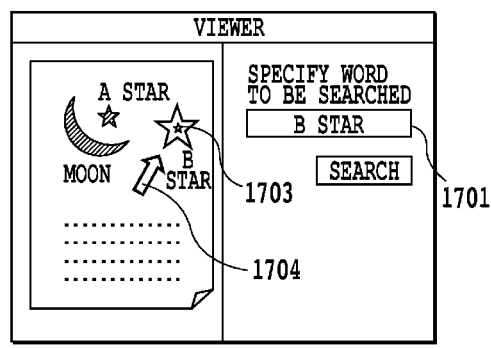

The input window 1701 in FIGS. 17A and 17B shows a state in which "B star" is specified as the word to be searched. The flow of search is the same as that described above, so that the description thereof will be omitted. In a case of an electronic document created without considering the visibility during the search, as shown in FIG. 17A, highlighting as indicated by reference numeral 1702 is performed. However, the hit object is very small, so that it is difficult to recognize where the object is located in the electronic document. Even when the position of the hit object is found, it is difficult to quickly identify what object it is. On the other hand, in a case of the electronic document created by this method, as shown in FIG. 17B, on the basis of the shape of the object, the transparent frame 1703 described so that the size thereof is slightly larger than that of the object (for example, larger than the object by 5 pixels) is highlighted. In addition to the above, the transparent frame 1704 indicated by an arrow, which is described as auxiliary information so that the position of the object can be easily found, is highlighted as a detection result at the same time. By the frame 1704 indicated by the arrow which is auxiliary information, the position of the hit object can be found instantly, and, by the transparent frame 1703, it is possible to instantly recognize what image is hit. Although, in some search applications, the highlighting color displayed in a search may be one predetermined color (for example, red), as described above, the object is displayed slightly larger than the actual size, and the auxiliary information such as an arrow is displayed, so that a user can easily recognize the object. When the highlighting color that should be displayed in a search is specified in the electronic document, if the object search application has a function to interpret the description thereof and change the highlighting color, the user can further easily recognize the object.

Figure 17C:
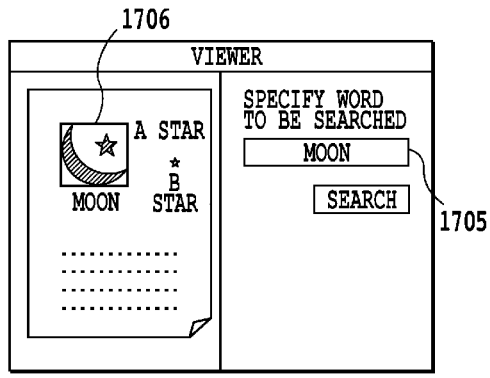
Figure 17D:
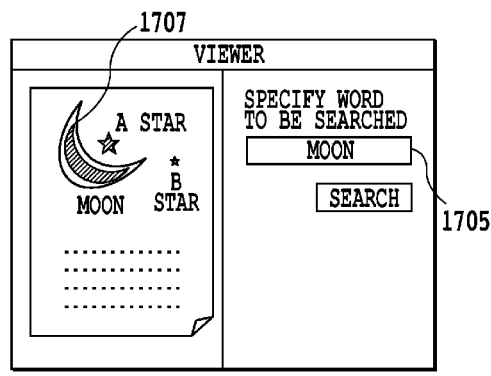

FIGS. 17C and 17D show a state in which "moon" is specified in the input field 1705 as the search result using other word. In a case of an electronic document created without considering visibility (specifically, in a case of an electronic document in which searched object is highlighted using a rectangle), another object may be included in the highlighted rectangle. In other words, as shown in FIG. 17C, another object ("A star" object) exists in the area 1706 highlighted on the basis of the "moon" object, so that it may be difficult to uniquely identify the hit object. On the other hand, the shape of the frame 1707 highlighted using the method of the present invention is created on the basis of the shape of the outer contour of the "moon" object, so that the object hit in the search can be easily identified. At this time, the frame 1707 is described so that the frame has a shape similar to the object and a size slightly larger than the object (for example, larger than the object by 3 pixels) on the basis of the shape of the object, and thereby the object can be more easily identified.

As described above, when converting a document image into electronic document data on the basis of the setting of FIGS. 7A to 7D, by the processing of steps S801 to S805, an object with a caption extracted from the document image and metadata used for search are associated with each other and extracted. According to the correspondence table in FIG. 7C, in step S1107 in FIG. 11, an image part description is created by the image cutout for a "photograph" object. In a case of a "line drawing" or "table" object to which a caption identifier is added, in step S1107, a vector path description is created by the vector conversion. Then, in step S1109 (FIG. 12), the vector path description of transparent frame that depends on the attribute of each object is created, and stored in association with the caption identifier. When the application browses or searches the electronic document data converted in this way, the vector path description with the transparent color is not visible when browsing. Therefore, the vector path description is displayed in a page without affecting the visibility of the drawn image. On the other hand, when the metadata is hit in the search, the vector path description with the transparent color is displayed with a highlighting color by the application. The vector path description can be controlled in accordance with the attribute or the shape of the target object or positional relationship with other objects, so that it is possible to highlight an arbitrary shape in accordance with the intention of a creator of the electronic document data. For example, by describing a rectangle frame slightly larger than the circumscribed rectangle of the target object, it is possible to circumscribe a portion corresponding to the target object with a frame slightly larger than the target object during a search, so that a user can easily identify the object. Further, when the target object is described in the vector path description, the object is highlighted in a shape similar to the object, so that it is easy for the user to identify the target object.

In summary, according to this embodiment, in the creation process of electronic document data which can search for objects other than characters with a keyword, the shape and the state of the object to be searched is determined, and the shape of the frame for highlighting the object is controlled. Based on this, it is possible to create electronic document data capable of highlight expression for a user to easily recognize and identify the hit object.

Further, when creating the vector path description of the frame, by referring to (reusing) the vector path description of the object and the vector path description of a predetermined shape defined in advance, it is possible to reduce the amount of data compared with a case in which all the frames are individually described. For example, when creating a rectangle frame, the vector path description requires 500 bytes or more to include shape information (rectangle drawing command, drawing position/drawing size), transparent drawing setting of the frame, thickness of the frame and highlighting color during highlighting, and so forth. As the complexity of the frame shape increases, naturally, the amount of description increases. For example, when the shape of the frame is set to a star shape, 1 Kbytes or more of description is required. On the other hand, when creating a frame by referring to a predetermined shape, although the definition of the predetermined shape requires the same size description, the vector path description of frame created by referring to a predetermined shape requires only a parameter description of the frame, so that the amount of description is reduced to about 200 to 300 bytes regardless of the shape of the frame. The parameter description of the frame includes, for example, the drawing position (absolute position or relative position with respect to the reference object), the drawing size (enlargement rate & enlargement amount), the setting of highlighting color, and so on. When creating rectangle frames for an image including 100 photographs in one page, by creating vector path descriptions of the frames by reference, data size can be reduced by 30 Kbytes or more per page compared with a case in which the frames are individually described.

As described above, according to this embodiment, it is possible to create electronic document data in which an object detected through a search can be highlighted so that a user can easily recognize the object while shapes and data states of the objects in the electronic document data are maintained.

(Second Embodiment)

In the description of the operation of the first embodiment, by using the correspondence table of FIG. 7C, for "photograph", "line drawing", and "table", a graphics description of each object is created as an image part, the image parts are included in the foreground image, and a transparent vector path description for highlighting the object is created for each object. In this embodiment, an example will be described in which all objects other than "character" ("photograph", "line drawing", and "table") are included in the background image, and a transparent vector path description is created for only objects to which a caption identifier is attached.

In this embodiment, a processing example in which the format conversion unit 305 in FIG. 3 performs control on the basis of the correspondence table of FIG. 70 will be described. The processing flow is the same as that of the first embodiment (FIG. 11), so that the description of the processing steps in which the same operation is performed will be omitted.

According to the correspondence table of FIG. 7D, the "photograph" object is set to be included in the background image. Therefore, in steps S1107 and S1108 in FIG. 11, the image cutout processing unit 903 in FIG. 4 does not perform the image part creation process and the image part deletion process from the background image, and the process proceeds to step S1109. According to the correspondence table of FIG. 7D, in a case of "line drawing" and "table" objects, the setting indicates that the vector conversion is performed, but the deletion process from the back ground image is not performed. Therefore, in step S1107, the vector conversion processing unit 402 creates a vector path description of the object and temporarily stores it in the storage unit 211. In the next step S1108, the deletion process is not performed, and the process proceeds to step S1109.

In step S1109 (details are shown in FIG. 12), the electronic document description creation unit 404 creates the vector path description of transparent frame. In steps S1202 to S1204 in FIG. 12, a creation method of the transparent frame (step S1205 or S1206) is determined.

In the first embodiment, in step S1205, the electronic document description creation unit 404 creates the transparent frame including the description of the reference instruction to the vector path of the object and the parameter description (enlargement, movement, setting of highlighting color, and the like). This is because the vector path description of the object is described in the foreground image, so that the reference (reuse) is possible. On the other hand, in this embodiment, the object is embedded in the background, so that the vector path description of the object cannot be referred to (reused) in the same manner as in the first embodiment. Therefore, the format conversion control unit 406 creates the transparent frame by using the vector path description of the object created in step S1107 instead of the reference instruction for the vector path description of transparent frame, and additionally describing a parameter description therein.

In step S1206, in the same manner as in the first embodiment, the electronic document description creation unit 404 creates the vector path description of transparent frame by referring to (reusing) the vector path description of a predetermined shape. At this time, when the object is a "line drawing" or "table" object, the vector path description created in step S1107 is not required to create the transparent frame, so that the vector path description can be deleted from the storage unit 211.

When performing a search on the electronic document data converted in this way, during a normal operation, a page including the background image and the foreground image (character portion) is displayed. On the other hand, when the metadata is hit in the search, the vector path description with the transparent color is displayed with a highlighting color by the application, so that for a user, the object can be seen as if the object itself were hit in the search.

In this way, in the same manner as in the first embodiment, it is possible to create an electronic document in which user can easily find a search result by highlighting the transparent frame controlled in accordance with the attribute of each object. Further, by including all the objects other than "character" objects in the background image, the file size can be reduced compared with a case in which the extracted photograph objects and the background are respectively held as compressed image data separate from each other. This is because such data includes image information and header information for compression, and when the number of data of the objects increases, the header information corresponding to the number of data is held redundantly. In particular, the more sophisticated the image compression method is, the larger the header information for compression tends to be. Therefore, when creating an electronic document file from a document image including a large number of objects such as photographs, to reduce the total data size, it is more suitable to compress the objects as one image than to compress each object individually. For example, when image data is held as a JPEG-compressed stream, each stream inevitably includes a quantization table for decompression, Huffman code, and the like as the header information, the size of which is 700 bytes or more. When an image includes 100 photographs in one page, if both the photographs and the background are compressed as one image data, it is possible to reduce the data size by 70 Kbytes or more per page, compared with a case in which a total of 101 image data including the background and the photographs are compressed individually.

With respect to electronic document data or with respect to an image part created by the image cutout of individual "photograph", "line drawing", or "table" image which is a search target in the electronic document data, the description method thereof and the adding method of caption identifier to the image part may be timely selected by a user. For example, when there is a high probability that the objects of "photograph", "line drawing" and the like are reused in another document, as shown in FIG. 7C, "photograph" is cut out as an image part to increase the image resolution, and "line drawing" is described in the vector path description by performing vector conversion. Then, a transparent frame to which a caption identifier is added is created for each object. In this way, the objects which may be reused as image parts are stored in the electronic document as a vector path description or a high-resolution object image. By doing so, even when these objects are copied to another document, the objects can be used without losing the image information as much as possible. When the data size of the electronic document data is desired to be small and the objects are desired to be able to be searched for, as shown in FIG. 7D, objects of "photograph" or the like are included in the "background", the description of the transparent frame is created, and the caption identifier is attached to the description. By doing so, a display in which an object in the image is seen as if the object were searched for can be performed, and the compression rate of the image data can be increased, so that the data size can be reduced. In addition, it is possible to perform a more detailed operation in accordance with the type of the object.

Instead of causing a user to select how to use the electronic document data, it is possible to automatically select the description method of the image part created by the image cutout and the attachment method of the caption identifier in accordance with the number of "photograph" and the like objects or the size or characteristics of each object. In this case, the methods may be changed for each document or each page to use the electronic document data.

In this way, by appropriately selecting the description method of the image part created by the image cutout, and properly selecting the attachment method of the caption identifier, it is possible to create electronic document data according to the purpose of use. Therefore, there is an effect that electronic document data that is easy to use for a user is provided.

(Third Embodiment)

In a third embodiment, an example of a method will be described which automatically calculates parameters of a frame (absolute position or relative position to a reference object, size or enlargement rate, and the like) that is necessary when creating a vector path description of transparent frame for an object to which a caption identifier is attached.

Figure 18:
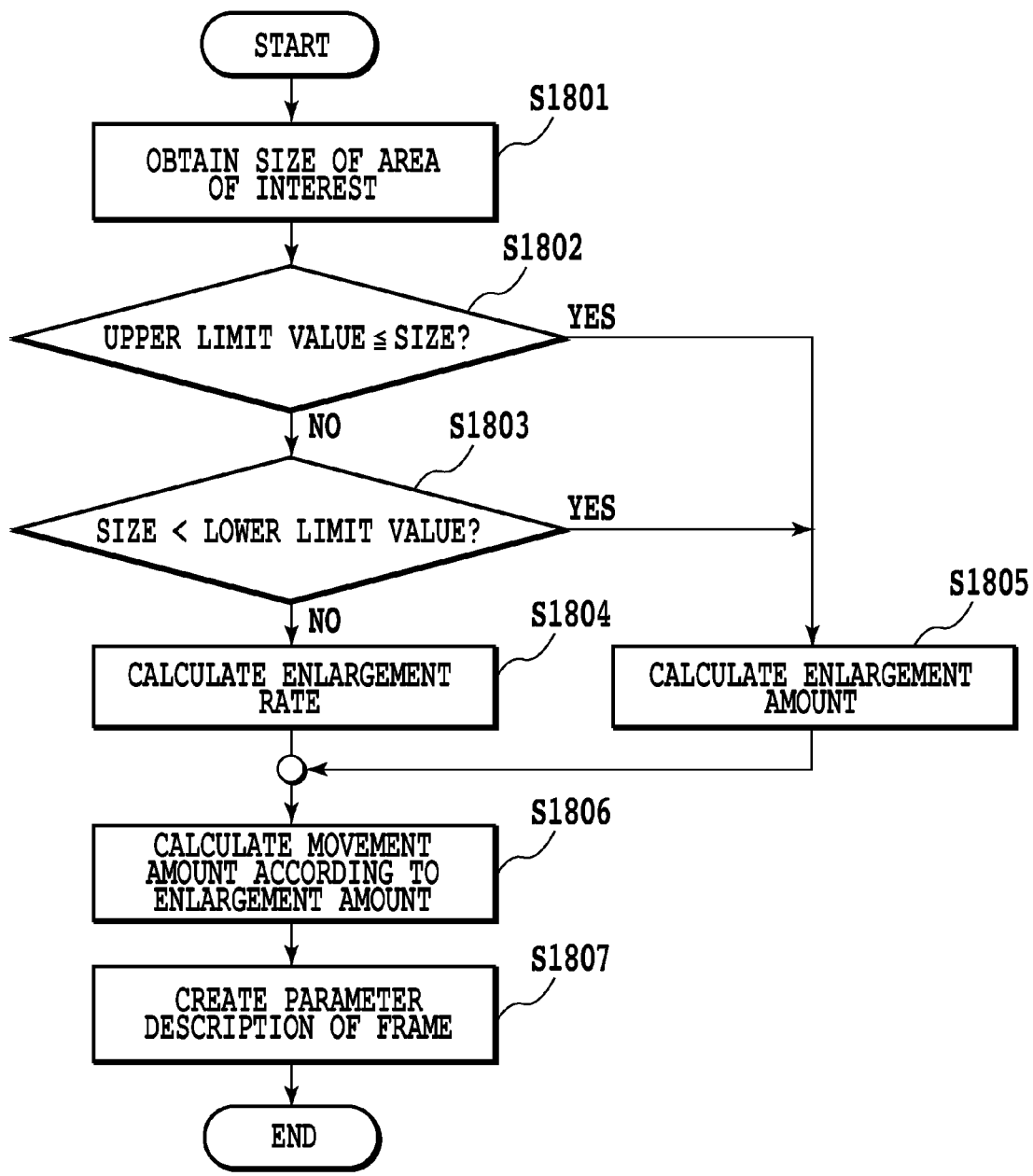
FIG. 18 is a flowchart for explaining parameter description creation process according to a third embodiment of the present invention.

The method for calculating parameters of a frame will be described with reference to a processing flow in FIG. 18.

In step S1801, the electronic document description creation unit 404 obtains the area size of an object accompanied by a processing target caption. This information is stored in the storage unit 211.

In step S1802 and step S1803, the electronic document description creation unit 404 compares predetermined upper limit value and lower limit value with the size obtained in step S1801. If the size of the object is within the lower limit value and the upper limit value inclusive (lower limit value ≤ object size < upper limit value), the process proceeds to step S1804. If the size is the upper limit value or more or the lower limit value or less, the process proceeds to step S1805.

In step S1804, the electronic document description creation unit 404 calculates an enlargement rate according to the size of the object (for example, 120% enlargement of the object). When the object is small, a large enlargement rate is set, and when the object is large, a small enlargement rate is set. In this way, the size of the frame can be changed in accordance with the size of the object, so that it is possible to create an image in which the search result can be easily viewed and checked.

On the other hand, in step S1805, the electronic document description creation unit 404 calculates the enlargement amount so that the transparent frame is larger than the object by a certain size. The enlargement amount may be changed depending on whether the object size is the upper limit value or more or the lower limit value or less. For example, even when the transparent frame is set to be always larger than the circumscribed figure of the object by 10 pixels, it is possible to set so that a transparent frame larger than the object by 5 pixels is created for an object of the upper limit value or more, and a transparent frame larger than the object by 10 pixels is created for an object of the lower limit value or less.

In step S1806, the electronic document description creation unit 404 calculates a movement amount of the transparent frame according to the enlargement rate & enlargement amount calculated in steps S1804 and S1805. This is because, when the transparent frame is not enlarged from the center of the object, and for example, when the transparent frame is enlarged from the upper left of the object, the transparent frame needs to be moved so that the object is located in the center of the transparent frame.

In step S1807, the electronic document description creation unit 404 creates a parameter description of a frame from the calculated enlargement rate & enlargement amount and movement amount, and creates a vector path description of transparent frame on the basis of the processing flow in FIG. 12. The parameter description of a frame is the parameter description used when creating the vector path description of transparent frame in steps S1205 and S1206 in FIG. 12.

Figure 19:
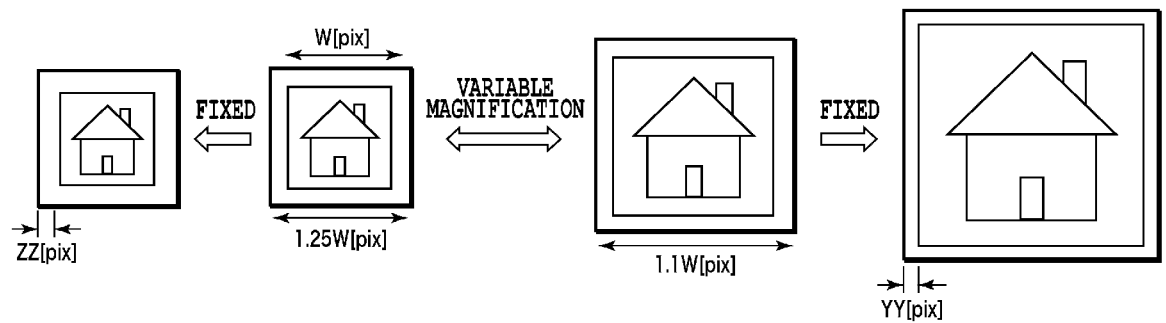
FIG. 19 is an illustration showing an example of a processing result according to the third embodiment of the present invention.
Figure 20:
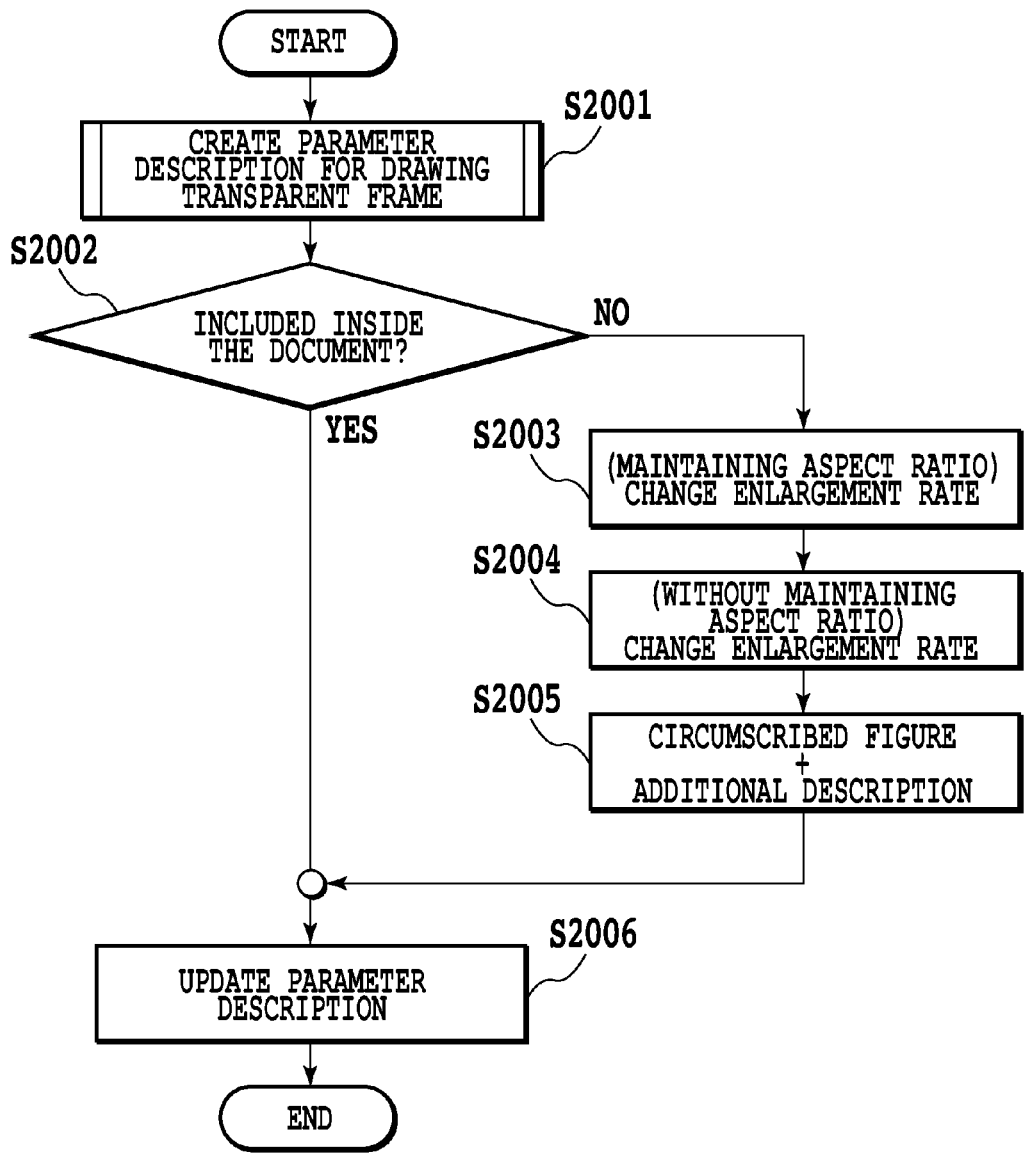
FIG. 20 is a flowchart for explaining parameter description creation process according to a fourth embodiment of the present invention.

In the procedure described above, the size (enlargement rate & enlargement amount) of the transparent frame is controlled automatically in accordance with the size of the object, and thereby the transparent frame having a size according to the size of the object can be created as shown in FIG. 19. Based on this, it is possible to create a transparent frame which has a size in accordance with the size of the object and can highlight the object in an easy-to-understand manner.

(Fourth Embodiment)

In the third embodiment, the method for creating a parameter description (enlargement rate & enlargement amount, movement amount, and the like) in accordance with the object size is described. In a fourth embodiment, a control method when the created parameter description protrudes outside of the image will be described. An operation flow of this embodiment will be described with reference to FIG. 20 and FIGS. 21A to 21D.

Figure 21A:
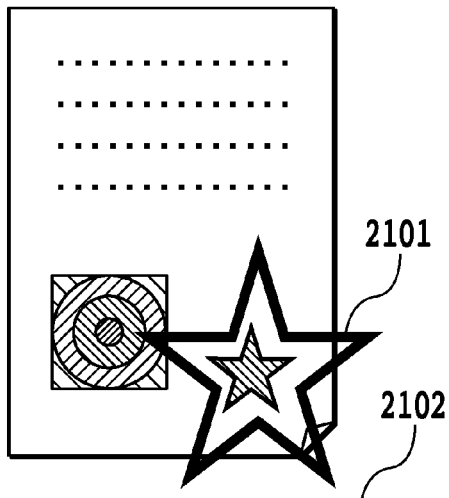
FIGS. 21A to 21D are illustrations showing an example of a processing result according to the fourth embodiment of the present invention.

In step S2001, the electronic document description creation unit 404 creates a parameter description (enlargement rate & enlargement amount, movement amount, and the like) in accordance with the object. This processing uses the method (FIG. 18) described in the third embodiment. FIG. 21A is an example in which the transparent frame 2101 is drawn on the basis of the parameter description 2102 obtained in step S2001. In the parameter description 2102, the enlargement rate and the movement amount are set as follows: "transform=scale(1.5,1.5) translate(−100, −100)".

In step S2002, the electronic document description creation unit 404 checks whether or not the frame is included inside the document when the frame is drawn using the created parameter 2102. If the frame is included inside the document, the process proceeds to step S2006, where the frame is created as a parameter description. On the other hand, if the frame protrudes outside of the document, the process proceeds to step S2003. In FIG. 21A, at the left side and the bottom side of the document, the transparent frame is drawn outside of the document, so that the processing of step S2003 and the following steps is performed.

Figure 21B:
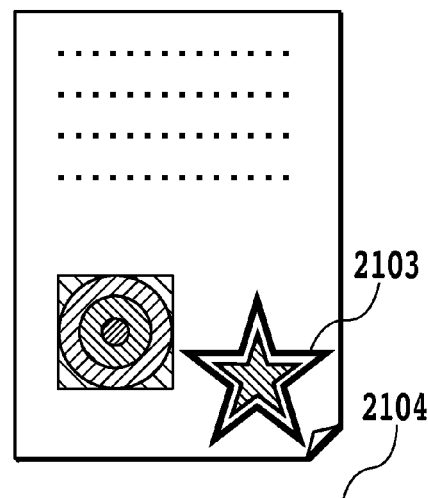
Figure 21C:
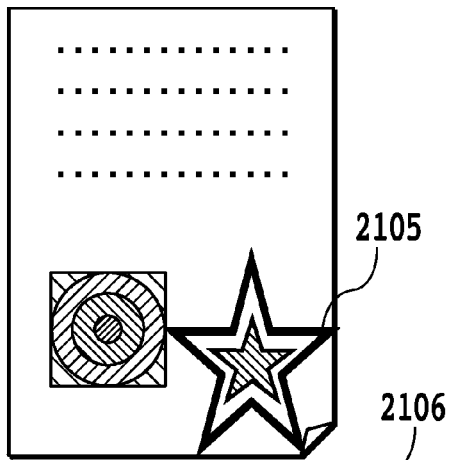

In step S2003, the electronic document description creation unit 404 decreases the enlargement rate & enlargement amount so that the frame is included inside the document while the aspect ratio is maintained. At this time, the enlargement rate & enlargement amount are adjusted so that they are not smaller than a predetermined lower limit value of the enlargement rate & enlargement amount (the value may be the lower limit value used in the second embodiment). For example, as shown in FIG. 21B, the enlargement rate & movement amount are changed to "transform=scale(1.2,1.2) translate(−40, −40)" to create the parameter description 2104 and draw the transparent frame 2103.

When a desired parameter description cannot be obtained in step S2003, in step S2003, the electronic document description creation unit 404 changes the enlargement rate & enlargement amount without maintaining the aspect ratio. In the same manner as in step S2003, also in this processing, a correction is applied in which the enlargement rate & enlargement amount are not smaller than the lower limit value. The created parameter description is, for example, "transform=scale(1.2,1.4) translate(−40, −80)". This description is the parameter description 2106 in which the enlargement rate & enlargement amount are changed without maintaining the aspect ratio, and the transparent frame 2105 is drawn using this parameter description.

Figure 21D:
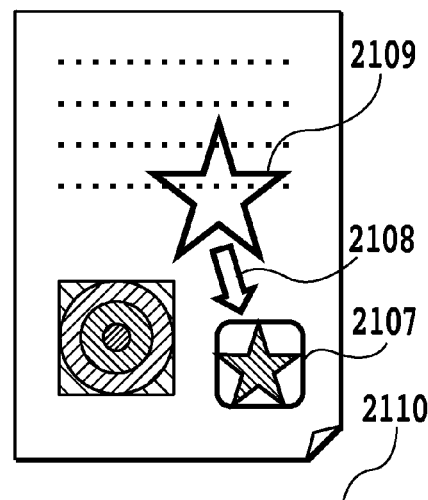

When a desired parameter description cannot be obtained in step S2004, in step S2005, the electronic document description creation unit 404 forcibly changes the transparent frame to a figure (for example, rectangle) which circumscribes the object, and changes the setting so that a drawing description for supplementary explanation is added. For example, as shown in FIG. 21D, the transparent frame 2107 is created as a circumscribed rectangle of the object or a rectangle slightly larger than that. Further, the parameter description 2110 is created which describes additional descriptions 2108 and 2109 for highlighting the transparent frame.

In step S2006, the electronic document description creation unit 909 updates the parameter modified in steps S2001 to S2005 as a parameter description for describing the transparent frame that is included inside the document.

By the above processing, it is possible to automatically perform a highlight display in which the transparent frame does not protrude outside of the document and which is easy to understand for a user.

(Fifth Embodiment)

In the first embodiment, among the objects drawn by the vector path description, for objects having a small size or objects accompanied by an adjacent object, a transparent frame is created by reusing the vector path description of the object. In this embodiment, further, whether or not the vector path description of the object can be used for the transparent frame is determined, and the creation method of the transparent frame is controlled.

An operation flow of this embodiment will be described with reference to FIG. 22. The same steps as those in FIG. 12 in the first embodiment are given the same step numbers. The operation flow will be described using an electronic document 2300 shown in FIG. 23A as an input example. The electronic document 2300 includes the objects 2301, 2302, and 2303, to each of which a caption is added. All of these objects are created by a vector path description.

Figure 22:
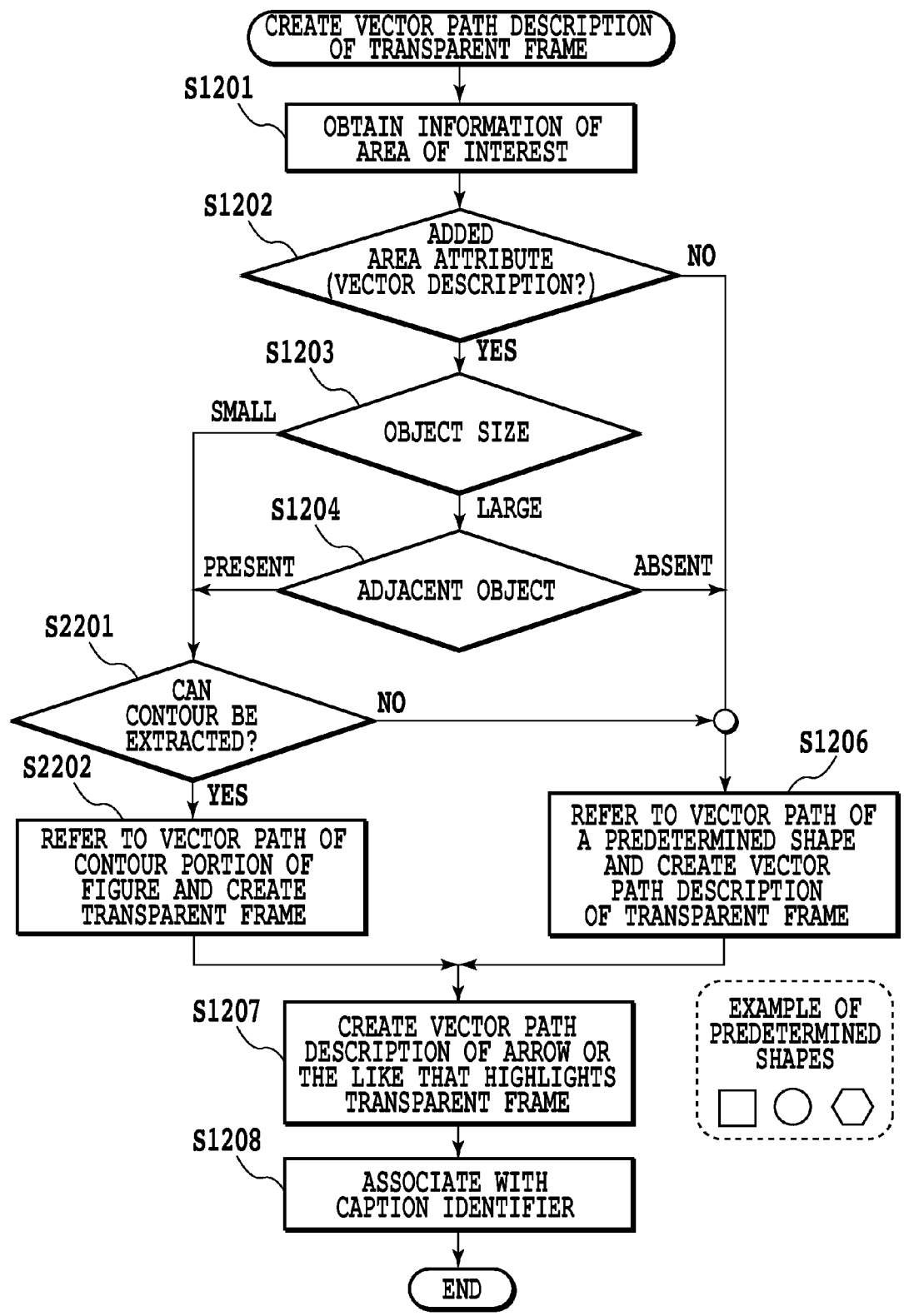
FIG. 22 is a flowchart for explaining processing of a vector conversion processing unit 402 in FIG. 4 according to a fifth embodiment of the present invention.

From step S1201 to step S1204 in FIG. 22, the electronic document description creation unit 404 determines whether the transparent frame is created by reusing the vector path description of the object or the transparent frame is created by reusing the vector path description of a predetermined shape. Since the details of the processing are the same as those in FIG. 12 in the first embodiment, the description thereof will be omitted.

In step S2201, the electronic document description creation unit 404 determines whether or not the vector path description of the contour portion (outer contour) can be extracted from the vector path description of the object. If the contour portion can be extracted, the process proceeds to step S2202, and if it cannot be extracted, the process proceeds to step S1206. This is because it is considered that, when the object has a complex shape, if the inside drawing of the object is reproduced, the frame highlighted during the search is superimposed on the hit object and displayed, and thus the hit object cannot be recognized. Therefore, the visibility is improved by using only the contour portion, which is a part of the object, to create the transparent frame.

Figures 23A, 23B, 23C:
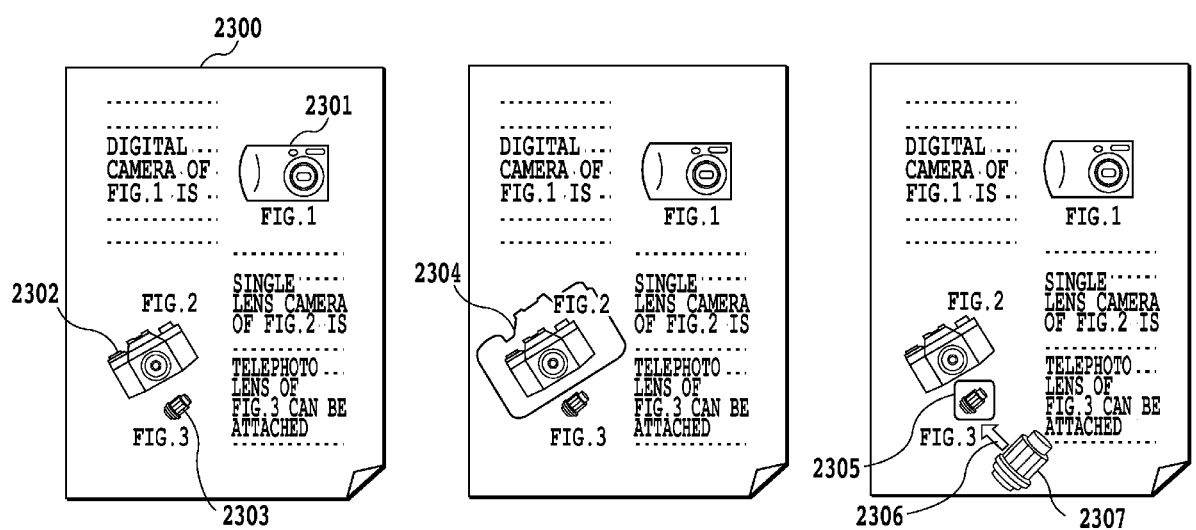
FIGS. 23A to 23C are illustrations showing an example of a processing result according to the fifth embodiment of the present invention.

In step S2202, the electronic document description creation unit 404 creates the vector path description of transparent frame by referring to (reusing) only the description of the contour portion which is apart of the vector path description of the object. The object 2302 in FIG. 23A is an object from which the contour can be easily extracted, so that the electronic document description creation unit 404 refers to (reuses) the vector path description of the contour portion of the object 2302 to create the transparent frame 2309 in FIG. 23B.

On the other hand, in step S2201, if it is determined that the contour portion of the object is difficult to be extracted, in step S1206, the electronic document description creation unit 404 creates a transparent frame by referring to (reusing) the vector path description of a predetermined shape defined in advance. The object 2303 in FIG. 23A is determined to be an object from which the contour is difficult to be extracted, so that the electronic document description creation unit 404 refers to (reuses) a vector path description of a rectangle which is a predetermined shape to create the transparent frame 2305 in FIG. 23C.

In step S1207, the electronic document description creation unit 404 creates a vector path description for adding supplementary information to the transparent frame created in step S2202 and step S1206. In particular, in step S2201, if it is determined that the contour portion of the object is difficult to be extracted, additional information is described here. This is because the transparent frame for highlighting is created using a predetermined shape, and thus when the object is small or there is another object near the object, it is impossible to identify what (which) object is hit in the search. Therefore, it is necessary to create an easy-to-understand display by, for example, adding a description of an arrow, and creating a transparent frame at a position where the transparent frame does not overlap the hit object itself by reusing the vector path description of the object without change. As a supplementary explanation for the transparent frame 2305 of the object 2303 in FIG. 23C, the arrow 2306 and the enlarged FIG. (2307) of the object itself are described.

In step S1208, processing for associating the caption identifier with the created transparent frame is performed.

A result of a search performed using a keyword "telephoto lens" on the electronic document 2300 created in the above processing will be briefly described. An anchor character string "FIG. 3" is associated with the object 2303. The anchor character string matches the character string "FIG. 3" written in the body text, so that "telephoto lens" is extracted as the caption character string for the object 2303. Then, the transparent frames 2305 to 2307 to which the same caption identifier as that of the caption character string "telephoto lens" is attached are hit as a search result, and highlighted. In this way, it is checked whether the vector path description of the object can be reused as a transparent frame, and if it can be reused, a transparent frame is created by reusing a part (contour portion) of the object path description of the object. If it cannot be reused, by disposing an arrow, an enlarged figure of the object, and the like near the object as supplementary information in addition to the vector path description of a predetermined shape, it is possible to create an electronic document in which the search result can be easily recognized and identified when the search is performed.

(Sixth Embodiment)

In the first to the fifth embodiments, the transparent frame reusing the vector path description of a predetermined shape is created. In this embodiment, a method will be described which creates a transparent frame more suitable to the shape of the object by analyzing the shape of the object and controlling the shape of the transparent frame.

A processing flow of this embodiment will be described with reference to FIG. 24. The same processing steps as those in FIG. 12 of the first embodiment and FIG. 22 of the fifth embodiment are given the same step numbers and the description thereof will be omitted.

In step S2401, the electronic document description creation unit 404 performs analysis process of the object. The analysis process of the object includes analyses of the degree of rectangularity and the degree of circularity of the object, calculation of the degree of tilt, an analysis of color information of the object, or the like.

Figure 25:
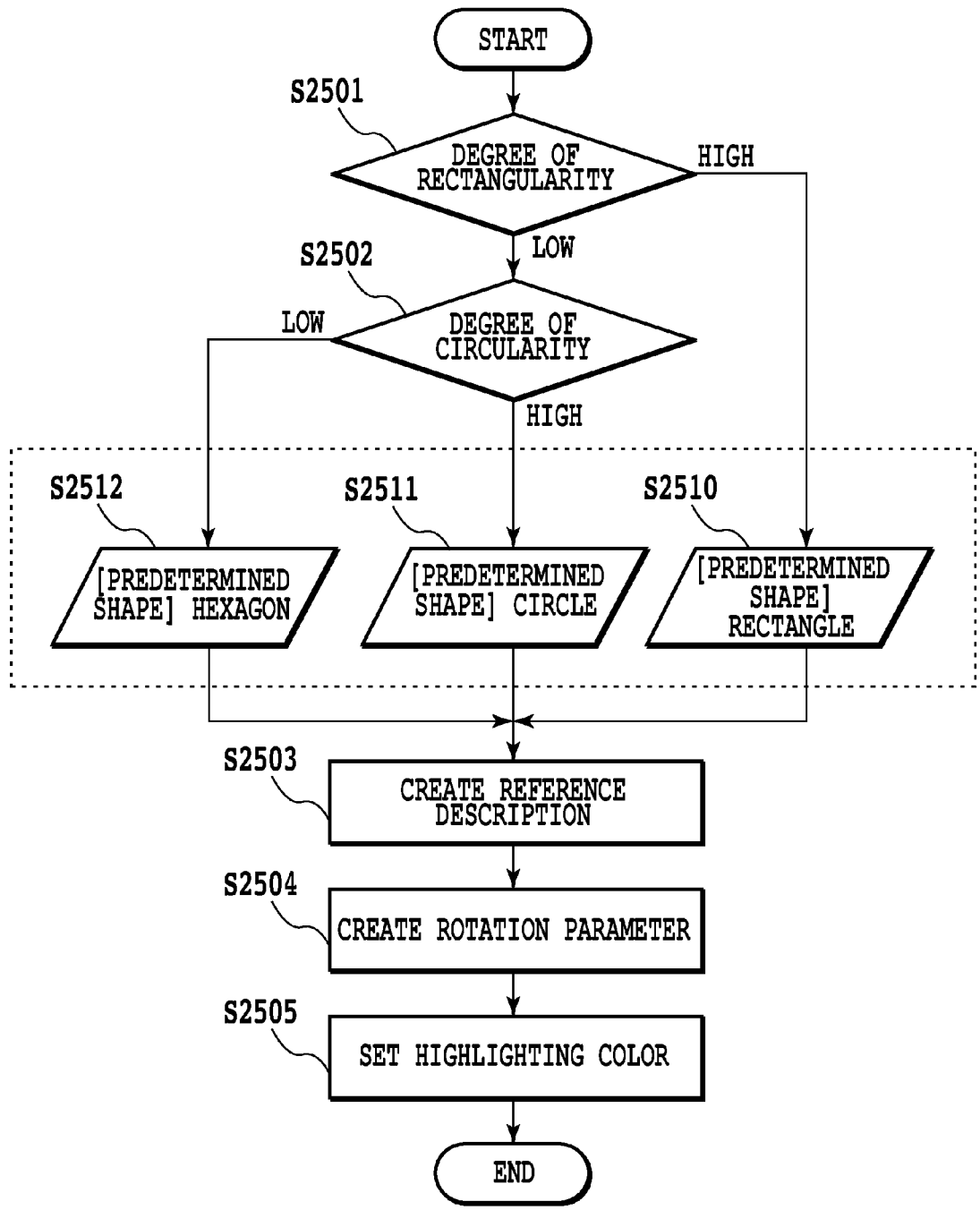
FIG. 25 is a flowchart for explaining the vector conversion processing unit according to the sixth embodiment of the present invention.

In step S2402, the electronic document description creation unit 404 creates a vector path description of a transparent frame suitable to the shape of the object. FIG. 25 shows an example of this processing. The description of this embodiment assumes that three types of shapes "rectangle", "circle", and "hexagon" are defined as the predetermined shapes.

In step S2501 in FIG. 25, the electronic document description creation unit 904 performs determination process of the degree of rectangularity of the object. If the degree of rectangularity is a predetermined threshold value or more (for example, the degree of rectangularity is 80% or more), the "rectangle" data 2510 is selected as a predetermined shape. If the degree of rectangularity is smaller than the threshold value, the process proceeds to step S2502.

In step S2502, the electronic document description creation unit 404 performs determination process of the degree of circularity of the object. If the degree of circularity is a predetermined threshold value or more (for example, the degree of circularity is 70% or more), the "circle" data 2511 is selected as a predetermined shape. If the degree of circularity is less than the threshold value, the "hexagon" data 2512 is selected as a predetermined shape.

Figure 26:
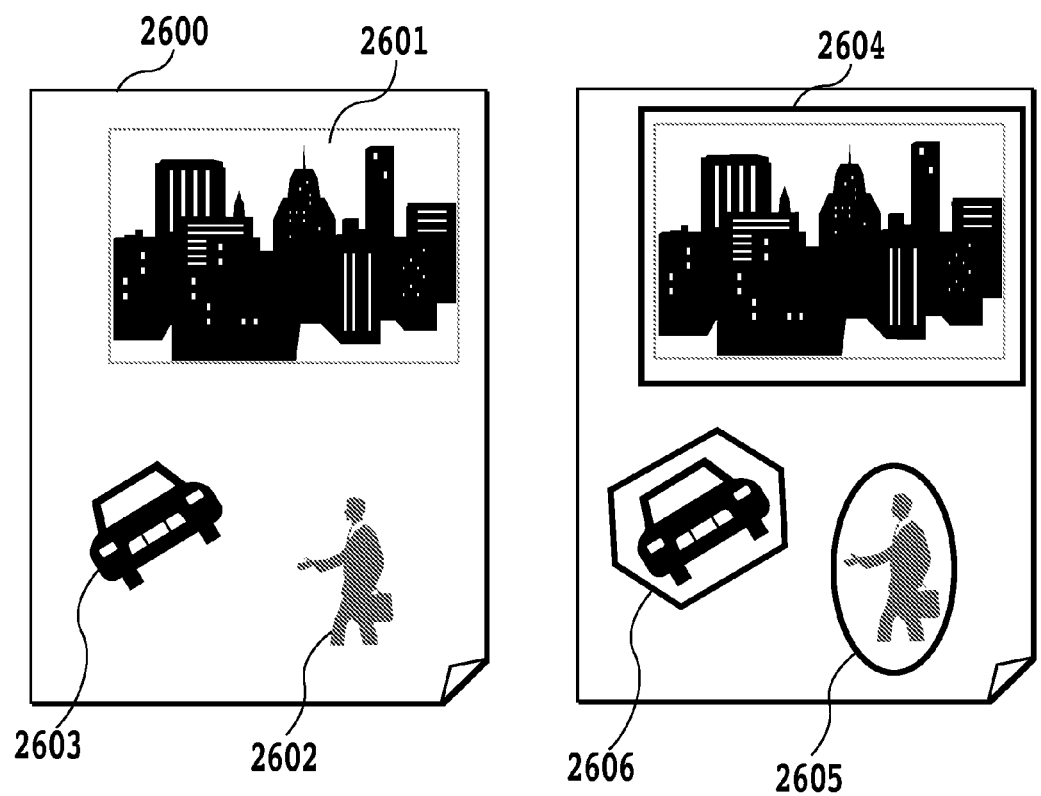
FIG. 26 is an illustration showing an example of a processing result according to the sixth embodiment of the present invention.

In step S2503, the electronic document description creation unit 404 creates a vector path description of transparent frame by reusing the predetermined shape data selected in the above described steps. FIG. 26 shows an example of the result. The input electronic document 2600 includes the objects 2601 to 2603, to each of which "photograph" attribute is added. Since the object 2601 has a high degree of rectangularity, the "rectangle" data is selected in step S2501, and the vector path description 2604 of transparent frame referring to a vector path description of "rectangle" is created. Since the object 2602 has a shape similar to an ellipse, the "circle" data is selected. The "hexagon" data is selected for the object 2603. Then, the vector path descriptions 2605 and 2606 of transparent frames are created respectively.

Figure 24:
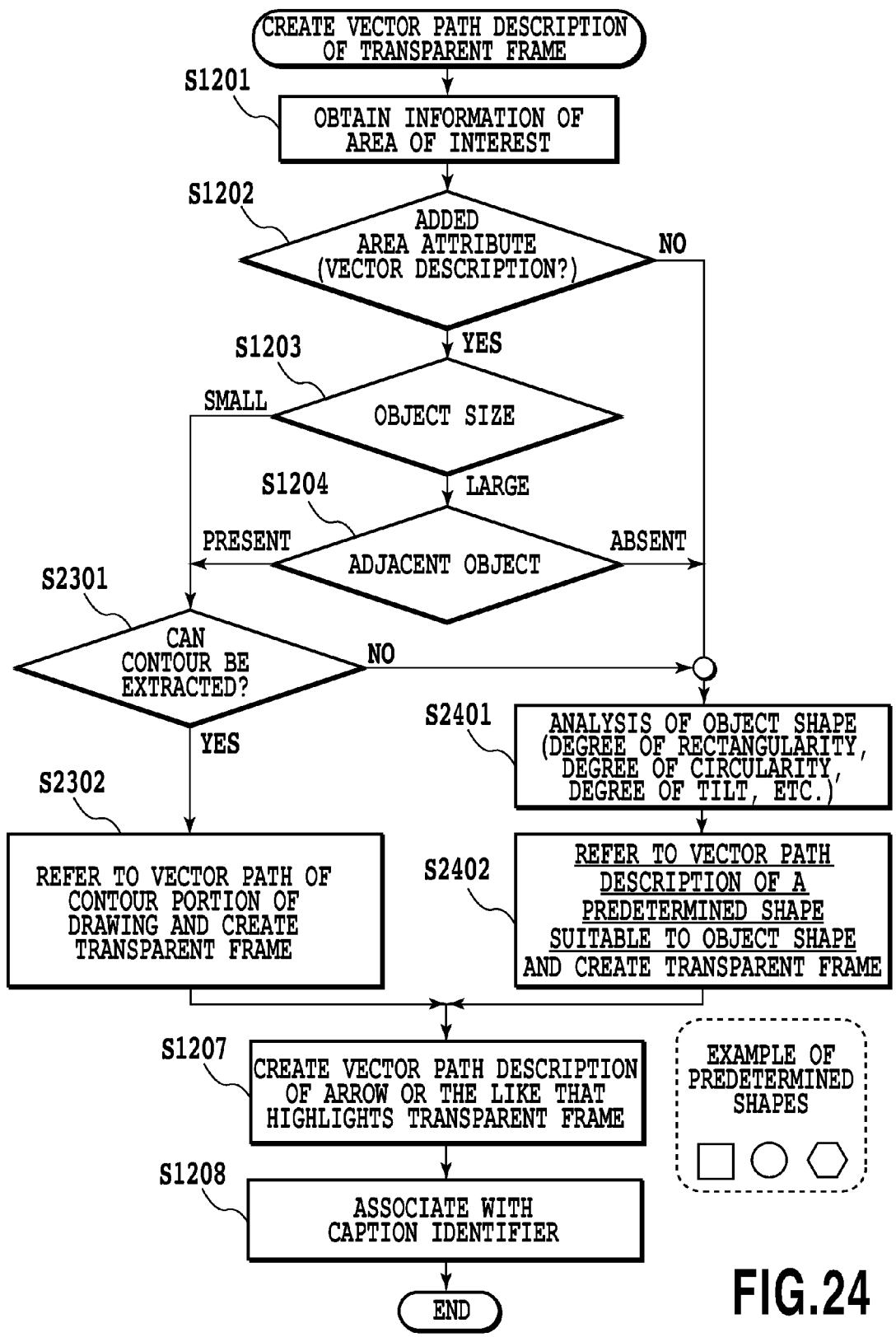
FIG. 24 is a flowchart for explaining a vector conversion processing unit according to a sixth embodiment of the present invention.

In step S2504, the electronic document description creation unit 404 creates a rotation parameter for creating a transparent frame more suitable to the object by using the degree of tilt of the object calculated in step S2401 in FIG. 24. Since the object 2603 in FIG. 26 is recognized as a tilted object, by tilting the transparent frame in the same manner as the object, the transparent frame 2606 is created.

In step S2505, the electronic document description creation unit 404 determines a color combination so that the object can be seen easily as much as possible when highlighted on the basis of the color information of the object obtained in step S2401 in FIG. 24, and sets the highlighting color. Specifically, the electronic document description creation unit 404 sets a color different from the color of the object as the highlighting color. Based on this, it is possible to prevent a situation in which the color of the object is similar to the highlighting color of the transparent frame and the result is indistinguishable. In the input example 2600 in FIG. 26, the color of the object is black, and thus, for example, the highlighting color of the transparent frame may be set to red.

In the description of this embodiment, the predetermined shapes are limited to "rectangle", "circle", and "hexagon". However, the predetermined shapes are not limited to those, and a star shape, a cloud shape, and the like may be used. The items of the analysis and the selection method of the predetermined shape are not limited to those described above.

By the processing described above, the frame highlighted during the search becomes more suitable to the shape of the target object while reducing the file size when the frame is created, so that it is possible to realize a highlighted expression that is easy to understand for a user.

(Seventh Embodiment)

In the first to the sixth embodiments, the most suitable transparent frame, which is described in the object area on the basis of the position and the size of the object area and information obtained by image-processing the object, is automatically created. In a seventh embodiment of the present invention, a mechanism in which a user can freely set the shape, the line width, and the like of the transparent frame to be described is provided.

Figure 27A:
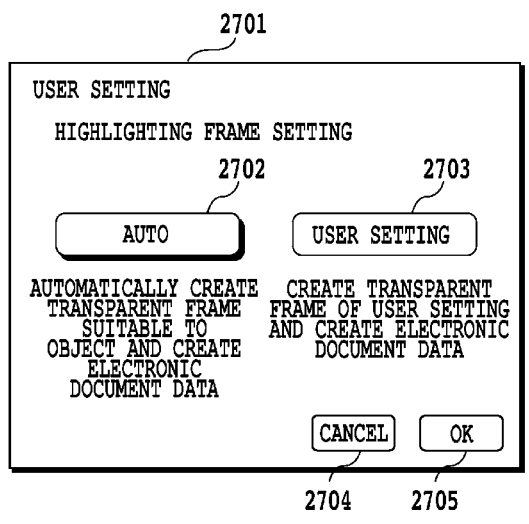
FIGS. 27A and 27B are illustrations showing an example of a user interface (UI) screen according to a seventh embodiment of the present invention.

FIG. 27A is an example of a user interface (UI) screen on which a user selects a purpose of the electronic document data displayed on the operation unit 203 in FIG. 2 equipped in the MFP 100 in FIG. 1. On the UI screen 2701, there are the button 2702 to set the creation method of the transparent frame for highlighting so as to be automatically determined, and the button 2703 for a user to set the creation method. The Cancel button 2704 to cancel selected content and the OK button to make a decision are also arranged. When the "Auto" button 2702 is selected, a transparent frame having a shape most suitable to each object is created in accordance with the procedures of the first to the sixth embodiments. On the other hand, when the "User Setting" button 2703 is pressed, a transparent frame having a shape set by the user is created for all the objects.

Figure 27B:
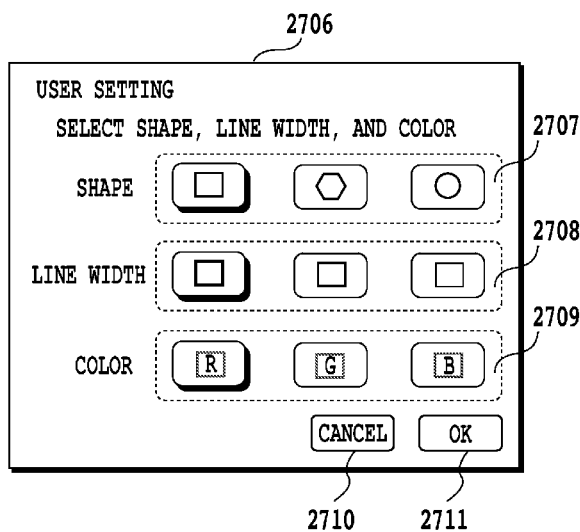

FIG. 27B is an example of a UI screen on which a user sets a shape of the transparent frame common to all the objects for highlighting the objects. On the UI screen 2706, there are the button 2707 to select a basic shape of the transparent frame, the button 2708 to select a line width, and the button 2709 to select a highlighting color. The user operates the selection buttons 2707 to 2709 on the UI screen 2706 to select a description method of the transparent frame, and presses the OK button 2711. Based on this, a control unit (not shown in the figures) in the data processing unit 218 transmits information related to the description of transparent frame specified by the user through the UI to the format conversion unit 305. When the Cancel button 2710 is pressed and user setting is not performed, default setting information is transmitted to the format conversion unit 305 by the control unit. The format conversion unit 305 performs a vector path description of the transparent frame on the basis of the received information in step S1109 (S1206). At this time, to make it possible to identify the object, it is desired to create the vector path description of the transparent frame by changing the size of the selected basic shape according to the size of the object in the procedure of FIG. 18.

As a result, in the "Auto" operation, an electronic document in which the user can easily recognize and identify the object hit in the search is created. On the other hand, in the "User Setting" operation, one vector path description is defined as a predetermined shape, and the vector path description is referred to when creating any one of all the frames, so that the file size is reduced. Further, determination process of the creation method of the frame or the shape of the frame is not performed for each object, so that it is expected that the processing performance when the output electronic document is created improves.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-000489, filed Jan. 5, 2010, which is hereby incorporated by reference herein in its entirety.

What is claimed is:

1. An image processing apparatus comprising:
an object extraction unit configured to extract an object from an input image;
a metadata extraction unit configured to extract metadata related to the object;
a determination unit configured to determine, on the basis of whether or not another object exists near the object, whether to describe a first vector path description or to describe a second vector path description, wherein the first vector path description is data of a first frame which circumscribes the object with a shape similar to a shape of the object, and wherein the second vector path description is data of a second frame which circumscribes the object with a predetermined shape, and wherein the determination unit determines to describe the first vector path description when another object exists near the object, and wherein the determination unit determines to describe the second vector path description when another object does not exist near the object;
a frame creation unit configured to create the first vector path description in the case that the determination unit determines to describe the first vector path description, and to create the second vector path description in the case that the determination unit determines to describe the second vector path description; and
a document creation unit configured to create an electronic document including data of the input image and the created first or second vector path description with which the metadata is associated,
wherein when a keyword search is performed on the created electronic document, highlight display is performed in accordance with the created first or second vector path description with which metadata that matches the keyword is associated.

2. The image processing apparatus according to claim 1, wherein the determination unit determines, on the basis of i) whether or not the object is described in a vector path description, ii) the size of the object, and iii) whether or not another object exists near the object, whether to describe the first vector path description or to describe the second vector path description, and
wherein, when the object is described in a vector path description and when the size of the object is small or another object exists near the object, the determination unit determines to describe the first vector path description, and
wherein, when the object is not described in a vector path description, or when the object is described in a vector path description, the size of the object is large, and there is no adjacent object near the object, the determination unit determines to describe the second vector path description.

3. The image processing apparatus according to claim 1, wherein the first vector path description is the data of the first frame which circumscribes the object with a shape similar to the shape of an outer contour of the object.

4. The image processing apparatus according to claim 1, wherein the first vector path description includes an enlargement parameter description for making a frame larger than the object.

5. The image processing apparatus according to claim 1, wherein a drawing color of the first and second vector path description is a transparent color.

6. The image processing apparatus according to claim 1, wherein the first and second vector path description includes a parameter description of a highlighting color used for highlight display when the keyword search is performed.

7. The image processing apparatus according to claim 6, wherein the highlighting color used for performing highlight display is different from the color of the object.

8. The image processing apparatus according to claim 1, wherein
the frame creation unit further creates a third vector path description of supplementary information which supplementarily indicates the object,
the document creation unit creates an electronic document including the input image, the first or second vector path description with which the metadata is associated, and the third vector path description of supplementary information, and
when a keyword search is performed on the electronic document, highlight display is performed in accordance with the first or second vector path description with which metadata that matches the keyword is associated and the third vector path description of supplementary information.

9. An image processing apparatus comprising:
an object extraction unit configured to extract an object from an input image;
a metadata extraction unit configured to extract metadata related to the object;
a determination unit configured to determine, on the basis of whether or not another object exists near the object, whether to describe a first vector path description or to describe a second vector path description, wherein the first vector path description is data of a frame which circumscribes the object with a shape similar to an outer contour of the shape of the object, and wherein the second vector path description is data of a frame which circumscribes the object with a predetermined shape, and wherein the determination unit determines to describe the first vector path description when another object exists near the object, and wherein the determination unit determines to describe the second vector path description when another object does not exist near the object;
a frame creation unit configured to create the first vector path description that is data of a frame which circumscribes the object with a shape similar to an outer contour of the shape of the object in the case that the determination unit determines to describe the first vector path description; and
a document creation unit configured to create an electronic document including data of the input image and the first vector path description with which the metadata is associated,
wherein when a keyword search is performed on the created electronic document, highlight display is performed in accordance with the first vector path description with which metadata that matches the keyword is associated.

10. An image processing apparatus comprising:
an extraction unit configured to extract an object from an input image and obtain area information of the object;
a determination unit configured to determine, on the basis of whether or not another object exists near the object, whether to describe a first vector path description or to describe a second vector path description, wherein the first vector path description is data of a transparent frame which circumscribes the extracted object with a shape of the obtained area information, and wherein the second vector path description is data of a frame which circumscribes the object with a predetermined shape, and wherein the determination unit determines to describe the first vector path description when another object exists near the object, and wherein the determination unit determines to describe the second vector path description when another object does not exist near the object;
a frame creation unit configured to create the first vector path description that is data of a transparent frame which circumscribes the extracted object with a shape of the obtained area information in a case that the determination unit determines to describe the first vector path description; and
an electronic document creation unit configured to create an electronic document including the input image and the created vector path description,
wherein the created vector path description of the transparent frame includes a parameter description of a highlighting color for highlighting the frame when an object is searched for and detected as a search result from the created electronic document.

11. An image processing method comprising:
an object extracting step of extracting, by an object extraction unit, an object from an input image;
a metadata extraction step of extracting, by a metadata extraction unit, metadata related to the object;
a determination step of determining, on the basis of whether or not another object exists near the object, by a determination unit, whether to describe a first vector path description or to describe a second vector path description, wherein the first vector path description is data of a first frame which circumscribes the object with a shape similar to a shape of the object, and where the second vector path description is data of a second frame with circumscribes the object with a predetermined shape, and wherein the determination unit determines to describe the first vector path description when another object exists near the object, and wherein the determination unit determines to describe the second vector path description when another object does not exist near the object;
a frame creation step of creating, by a frame creation unit, the first vector path description when determining to describe the first vector path description in the determination step, and creating, by the frame creation unit, the second vector path description when determining to describe the second vector path description in the determination step; and
a document creation step of creating, by a document creation unit, an electronic document including data of the input image and the created first or second vector path description with which the metadata is associated,
wherein when a keyword search is performed on the created electronic document, highlight display is performed in accordance with the created first or second vector path description with which metadata that matches the keyword is associated.

12. A non-transitory computer-readable recording medium having recording thereon code of computer-executable instructions that, when executed by an image processing apparatus, causes the apparatus to perform steps comprising:
an object extracting step of extracting by an object extraction unit, an object from an input image;
a metadata extraction step of extracting, by a metadata extraction unit, metadata related to the object;
a determination step of determining, on the basis of whether or not another object exists near the object, by a determination unit, whether to describe a first vector path description or to describe a second vector path description, wherein the first vector path description is data of a first frame which circumscribes the object with a shape similar to a shape of the object, and wherein the second vector path description is data of a second frame which circumscribes the object with a predetermined shape, and wherein the determination unit determines to describe the first vector path description when another object exists near the object, and wherein the determination unit determines to describe the second vector path description when another object does not exist near the object;
a frame creation step of creating, by a frame creation unit, the first vector path description when determining to describe the first vector path description in the determination step, and creating, by the frame creation unit, the second vector path description when determining to describe the second vector path description in the determination step; and
a document creation step of creating, by a document creation unit, an electronic document including data of the input image and the created first or second vector path description with which the metadata is associated,
wherein when a keyword search is performed on the created electronic document, highlight display is performed in accordance with the created first or second vector path description with which metadata that matches the keyword is associated.

* * * * *